(12) United States Patent
Chen

(10) Patent No.: US 11,460,620 B1
(45) Date of Patent: Oct. 4, 2022

(54) REFLECTIVE METASURFACES FOR BROADBAND TERAHERTZ LINEAR-TO-CIRCULAR POLARIZATION CONVERSION AND CIRCULAR DICHROISM SPECTROSCOPY

(71) Applicant: Triad National Security, LLC, Los Alamos, NM (US)

(72) Inventor: Hou-Tong Chen, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 244 days.

(21) Appl. No.: 16/504,026

(22) Filed: Jul. 5, 2019

Related U.S. Application Data

(60) Provisional application No. 62/835,596, filed on Apr. 18, 2019, provisional application No. 62/694,328, filed on Jul. 5, 2018.

(51) Int. Cl.
*G02B 5/30* (2006.01)
*G01J 4/02* (2006.01)
*G02F 1/01* (2006.01)
*G02B 1/00* (2006.01)

(52) U.S. Cl.
CPC .............. *G02B 5/3041* (2013.01); *G01J 4/02* (2013.01); *G02B 1/007* (2013.01); *G02F 1/0136* (2013.01)

(58) Field of Classification Search
CPC ......... G02B 5/3041; G02B 1/007; G01J 4/02; G02F 1/0136

USPC ................................................... 359/486.01
See application file for complete search history.

(56) References Cited

U.S. PATENT DOCUMENTS

| 2015/0349006 | A1* | 12/2015 | Wehner | H04N 5/2254 |
| | | | | 250/208.1 |
| 2018/0138661 | A1* | 5/2018 | Liang | H01S 5/06236 |
| 2019/0305436 | A1* | 10/2019 | Legay | H01Q 15/0013 |
| 2020/0335932 | A1* | 10/2020 | Winters | H01S 3/06712 |

FOREIGN PATENT DOCUMENTS

CN          108063317 A  *  5/2018   ............. G02F 1/00

OTHER PUBLICATIONS

Muhammad Tayyab Nouman, Ji Hyun Hwang & Jae-Hyung Jang. Ultrathin Terahertz Quarterwave plate based on Split Ring Resonator and Wire Grating hybrid Metasurface. Scientific Reports | 6:39062 | DOI: 10.1038/srep39062/ (Year: 2016).*
Mario G. Silveirinha. Linear to Circular Polarization Conversion Using a Metamaterial with Helical Inclusions. © 2005 IEEE (Year: 2005).*

(Continued)

*Primary Examiner* — Collin X Beatty
(74) *Attorney, Agent, or Firm* — Klarquist Sparkman, LLP

(57) ABSTRACT

Metasurface polarization convertors permit conversion of an input linear polarization to right- or left-handed circular polarization based on the orientation of the input linear polarization, over a broad bandwidth and with high efficiency. The reflected circular polarizations can be used to evaluate samples for circular dichroism. A THz time-domain detection provides a time domain terahertz signal that is Fourier transformed to produce a THz circular dichroism spectrum.

23 Claims, 22 Drawing Sheets

(56) References Cited

OTHER PUBLICATIONS

Yongjiu Li and Long Li. Reflective Multi-functional Polarization Converter Based on Anisotropic Metasurfaces. 978-1-5090-2017-1/16/$31.00 © 2016 IEEE (Year: 2016).*

Chen et al., "A review of metasurfaces: physics and applications," *Rep. Prog. Phys.*, 79:1-59 (2016).

Grady et al., "Terahertz Metamaterials for Linear Polarization Conversion and Anomalous Refraction," *Science*, 340:1304-1307 (May 16, 2013) and 16 pages of Supplementary Material.

Wiesauer et al., "Recent Advances in Birefringence Studies at THz Frequencies," *J. Infrared Milli. Terahz. Waves*, 34:663-681 (May 9, 2013).

* cited by examiner

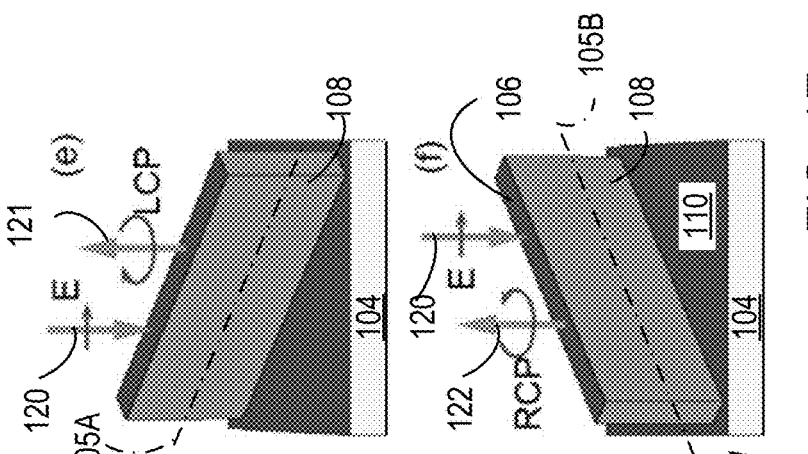
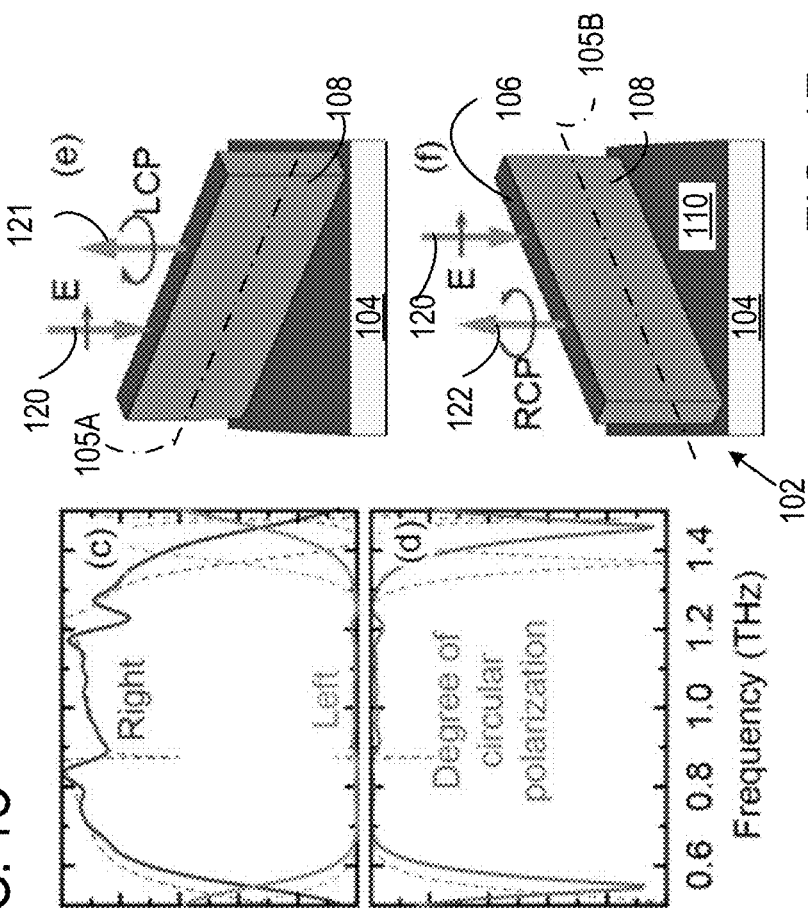
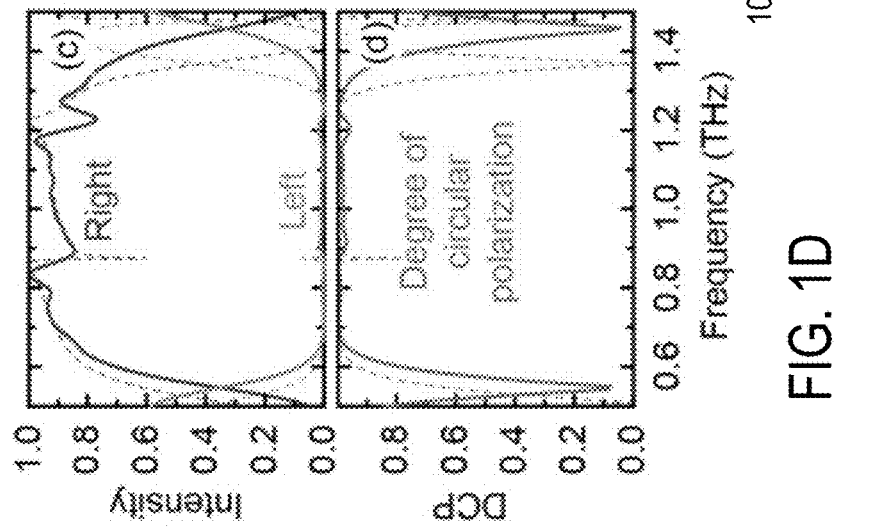
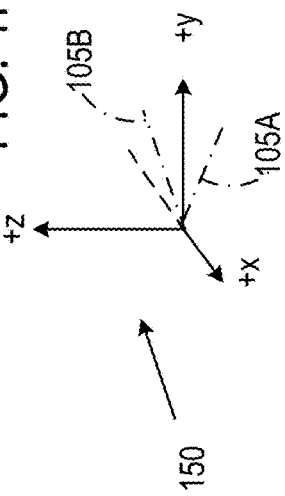
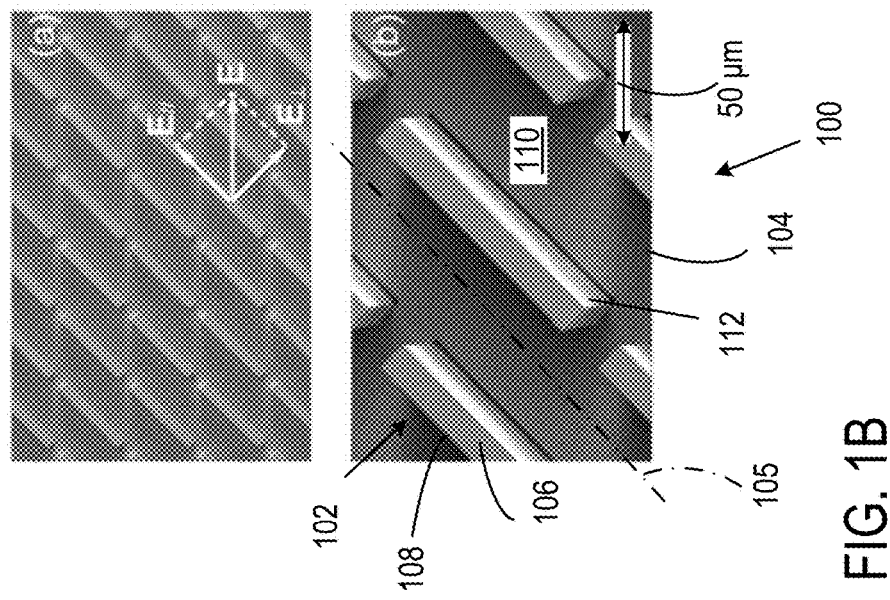

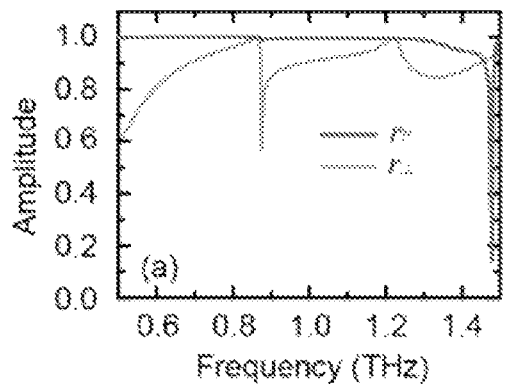

FIG. 2A

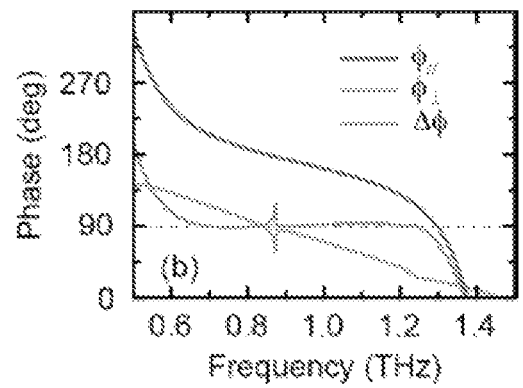

FIG. 2B $$\begin{cases} E_L^i = \frac{1}{2\sqrt{2}}\left(\left(\tilde{r}_{\text{major}} + \tilde{r}_{\text{minor}}\right) + \left(\tilde{r}_{\text{major}} - \tilde{r}_{\text{minor}}\right)e^{-i2\Omega t}\right) \\ E_R^i = \frac{1}{2\sqrt{2}}\left(\left(\tilde{r}_{\text{major}} + \tilde{r}_{\text{minor}}\right) + \left(\tilde{r}_{\text{major}} - \tilde{r}_{\text{minor}}\right)e^{i2\Omega t}\right) \end{cases}$$

$\Omega$ is the rotation frequency, $t$ is time

FIG. 3A $$\begin{cases} E_x^s = \frac{1}{4}\begin{pmatrix}\left(\tilde{r}_{\text{major}} + \tilde{r}_{\text{minor}}\right)(\tilde{\alpha}_R + \tilde{\alpha}_L)\beta_x + \left(\tilde{r}_{\text{major}} - \tilde{r}_{\text{minor}}\right)(\tilde{\alpha}_R + \tilde{\alpha}_L)\beta_x \cos 2\Omega t \\ +i\left(\tilde{r}_{\text{major}} - \tilde{r}_{\text{minor}}\right)(\tilde{\alpha}_R - \tilde{\alpha}_L)\beta_y \sin 2\Omega t\end{pmatrix} \\ E_y^s = \frac{-i}{4}\begin{pmatrix}\left(\tilde{r}_{\text{major}} + \tilde{r}_{\text{minor}}\right)(\tilde{\alpha}_R - \tilde{\alpha}_L)\beta_x + \left(\tilde{r}_{\text{major}} - \tilde{r}_{\text{minor}}\right)(\tilde{\alpha}_R - \tilde{\alpha}_L)\beta_x \cos 2\Omega t \\ +i\left(\tilde{r}_{\text{major}} - \tilde{r}_{\text{minor}}\right)(\tilde{\alpha}_R + \tilde{\alpha}_L)\beta_y \sin 2\Omega t\end{pmatrix} \end{cases}$$

FIG. 3B

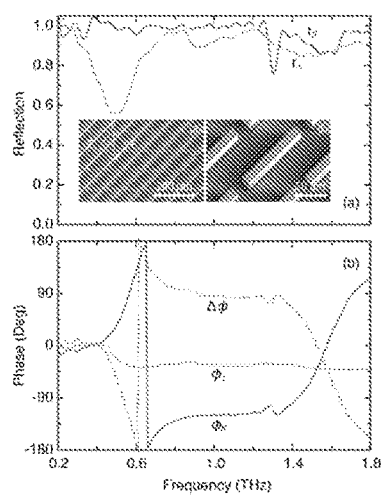
FIG. 9A
FIG. 9B
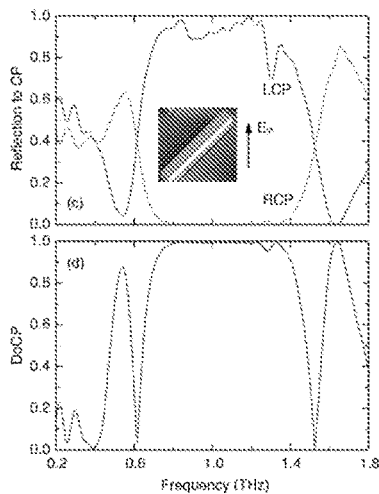
FIG. 9C
FIG. 9D
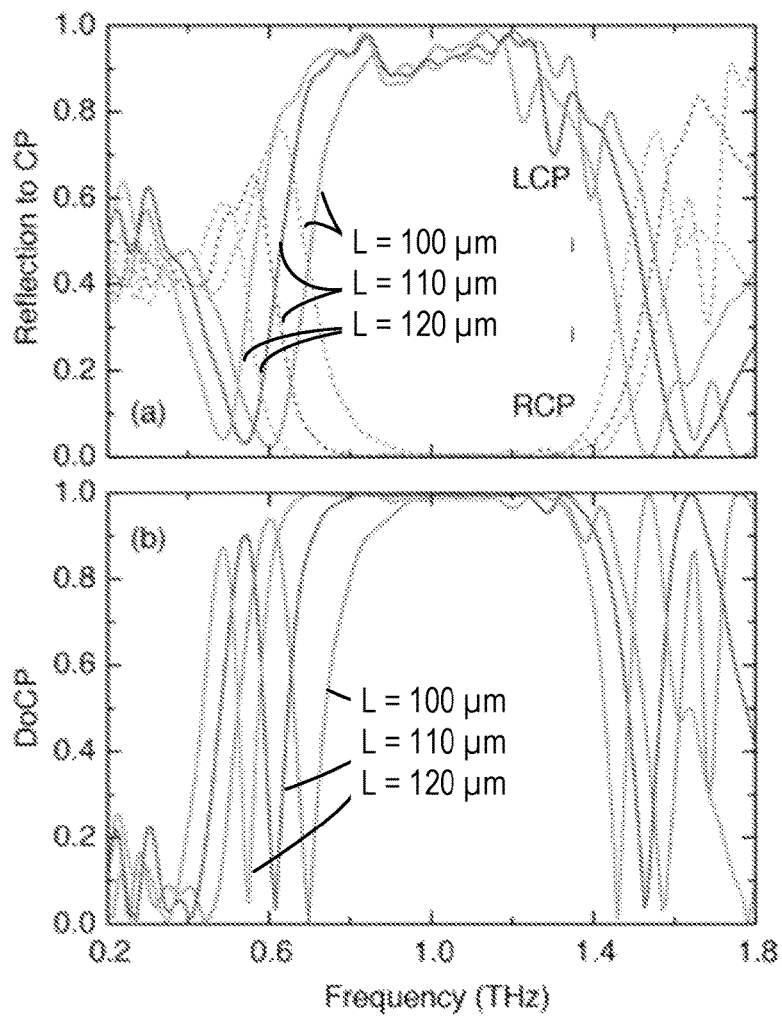
FIG. 10A
FIG. 10B

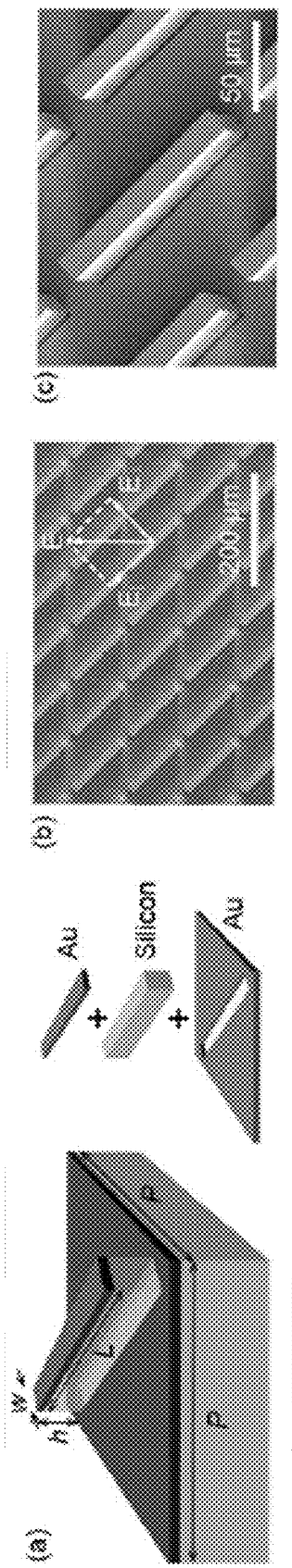

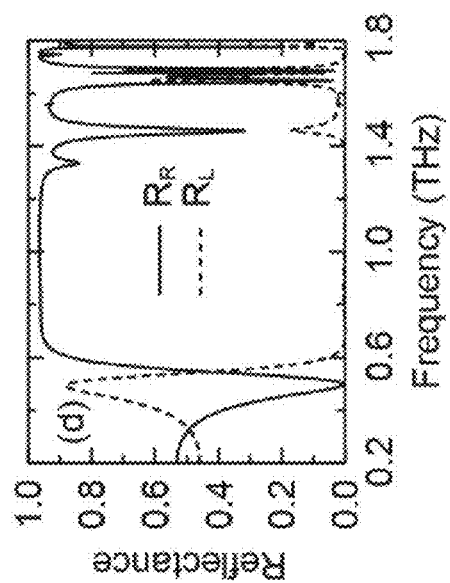
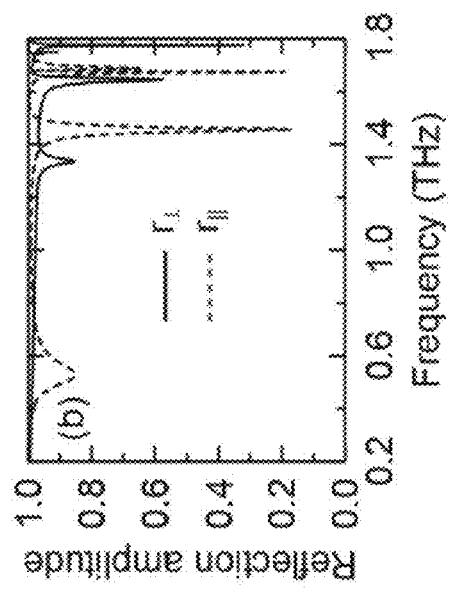
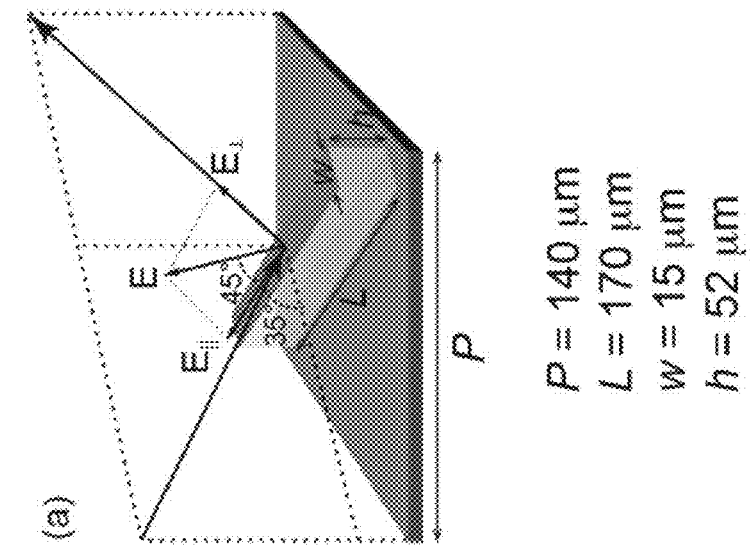
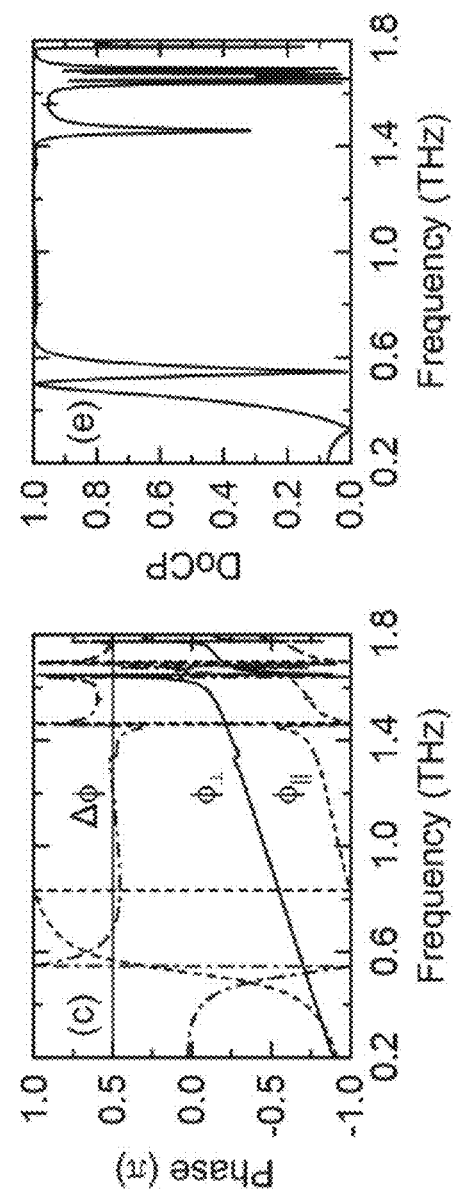
FIG. 17A   FIG. 17B   FIG. 17C   FIG. 17D   FIG. 17E

US 11,460,620 B1

REFLECTIVE METASURFACES FOR BROADBAND TERAHERTZ LINEAR-TO-CIRCULAR POLARIZATION CONVERSION AND CIRCULAR DICHROISM SPECTROSCOPY

CROSS REFERENCE TO RELATED APPLICATIONS

This application claims the benefit of U.S. Provisional Application 62/694,328, filed Jul. 5, 2018 and U.S. Provisional Application 62/835,596, filed Apr. 18, 2019, both of which are incorporated herein by reference.

ACKNOWLEDGMENT OF GOVERNMENT SUPPORT

This invention was made with government support under Contract No. DE-AC52-06NA25396 and Contract No. 89233218CNA000001 awarded by the U.S. Department of Energy. The government has certain rights in the invention.

FIELD

The disclosure pertains to metasurface polarization convertors that produce circular polarizations from an input linear polarization, and circular dichroism measurement systems using such convertors.

BACKGROUND

Circular dichroism (CD) is a measure of the difference in light absorption between left- and right-handed circular polarizations. Optical CD spectroscopy has been widely used in biochemistry to study chiral biomolecules, e.g., secondary structures, charge-transfer transitions, and geometric and electronic structures. To date, CD spectroscopy has been limited to wavelengths ranging from ultraviolet to mid-infrared. UV/vis CD is considered as a second-order effect due to the typically achiral chromophores; optical CD results only when the chromophores are chiral, placed in a chiral center of a molecule, or in an asymmetric environment due to the 3D nature of the molecule. That is, UV/vis CD tends to probe local structures, but not their dynamical motions in an extended scale. Vibrational CD in the near and mid-infrared ranges probes the local character of vibrational excitations, extending CD spectroscopy to enable detection of the mutual orientation of distinct groups and to provide three-dimensional structural information of small molecules in solution such as peptides, nucleic acids and carbohydrates. However, much information associated with dynamical motion within large biomolecules and their conformational changes is still missing, although important in determining many of the physical and functional properties of proteins, DNA, RNA, and protein-ligand interactions in solution. As charged chiral macromolecules, strong terahertz (THz) absorption is expected to couple with significant CD arising from the vibrations of the entire macromolecule or its large subunits exhibiting ubiquitous helical structures within proteins, or from conformational changes mediated by hydrogen bonding such as bubble formation within double stranded DNA. The richness of THz spectral fingerprints in biomaterials (even in solution) makes THz-CD spectroscopy potentially an important bio-specific sensor to detect functionally relevant dynamic modes. Additional interest in the THz-CD is in discriminating between different enantiomers of large molecules in the pharmaceutical and food industries, as drug and some food products are sold only as an enantiomerically pure form to enhance their effectiveness or minimize side effects. It is also expected that the rich THz-CD spectral fingerprints will find potential applications in bio-surveillance to detect biohazards.

However, a practical THz-CD spectrometer is still unavailable. The greatest challenge arises from the difficulty in circular polarization modulation in the THz frequency range. As typical coherent sources radiate linearly polarized light, in order to achieve CD spectroscopy a device is required to convert the linear polarization to circular polarizations and alternate dynamically between left- and right-handed circular polarizations over a broad spectral range of interest. In the optical regime, photoelastic modulators (PEMs) are commonly used in CD spectrometers. A PEM uses a block of piezoelectric material (fused silica, CaF2, LiF, ZnSe, Si, etc.) driven at its resonance frequency, in which the oscillating stress induces alternating birefringence, turning the PEM into a dynamic quarter-wave plate at the driving frequency. This process produces left-handed and then right-handed circular polarizations for a specific wavelength at the driving peaks and elliptical (including linear) polarization in between. By tuning the amplitude of the driving stress, appropriate phase retardation can be achieved for different wavelengths, thereby realizing broadband optical CD spectroscopy from ultraviolet to mid-infrared (down to ~1000 $cm^{-1}$). The PEM approach, however, cannot be applied in the THz frequency range (1 THz~33 $cm^{-1}$~300 μm), mainly due to the several orders of magnitude larger wavelengths, which requires prohibitively large electromechanical driving of the photoelastic material, and improved approaches are needed for THz-CD measurement.

SUMMARY

The present disclosure provides reflective metasurfaces for use in optical systems to convert linearly polarized light to circularly polarized light. The metamaterials may operate at various wavelengths. Accordingly, the metamaterials may be used in microwave, THz, infrared, and visible optical systems, for example. The metamaterials may be used in optical systems for THz circular dichroism spectroscopy, wireless communications, and other uses.

Metasurfaces of the present disclosure may be used for achromatic and linear-to-circular polarization conversion in the THz frequency range. In at least some examples, two orthogonal circular polarizations can be obtained by rotating the metasurface or the incident linear polarization by 90 degrees. Metasurface designs disclosed herein may operate at off-resonance frequencies, thereby allowing for broadband response with significantly low losses. Metasurface designs disclosed herein are scalable to operate at wavelengths ranging from microwave to visible.

In some examples, terahertz polarization convertors comprise a substrate having a substrate surface and a plurality of pillars extending from the substrate surface and having cross-sections parallel to the substrate surface. The cross-sections are associated with a first dimension that is greater a second dimension, wherein the first dimension is aligned with respect to a major axis. The plurality of pillars and the substrate surface are operable to convert a linear THz state of polarization (SOP) to a right-handed circular polarization (RCP) or a left-handed circular polarization (LCP) based on an alignment of the major axis with respect to the linear THz SOP. In some embodiments, the substrate surface is conductive and a pillar surface facing away from the substrate surface is conductive. Typically, the pillars extend from the substrate surface at least 10 μm, 15 μm, 20 μm, 30 μm, 45 μm, 50 μm, or more. In some cases, the substrate and pillars are formed in a common silicon substrate. In other alternatives, at least one conductive coating is situated on the substrate surface and on pillar surfaces facing away from the substrate surface. In still other examples, the pillars are arranged in at least one array or in offset arrays. In further embodiments, the pillars are arranged so that gaps between pillars along the major axis are at least 10 μm nm, 15 μm, 20 μm, 30 μm, 45 μm, 50 μm or more and gaps between pillars along an axis perpendicular to the major axis are at least 5 μm, 10 μm, 15 μm, 20 μm, 30 μm, 45 μm, 50 μm, and the pillars extend between about 10 μm and 200 μm along the major axis.

Methods comprise directing linearly polarized THz radiation to any of the above polarization converters to produce a circular SOP and directing the circular SOP to a sample. Typically, the circular SOP is formed by reflection from the polarization convertor and the linear SOP is at 45 degrees with respect to the major axis.

Methods of making a THz polarization convertors comprise defining a plurality of aligned elongated pillars on a silicon substrate and conductively coating at least a surface of the substrate from which the aligned elongated pillars extend and surfaces of the pillars facing away from the conductively coated surface of the substrate. In some examples, the pillars are formed by etching the silicon substrate. In typical examples, the pillars have rectangular, elliptical, or ovoid cross sectional areas and extend at least 10 μm nm, 15 μm, 20 μm, 30 μm, 45 μm, 50 μm, or more or less from the conductively coated substrate surface.

THz polarization modulators comprise any of the above polarization convertors and a rotational stage coupled to the polarization stage and operable to rotate the polarization convertor about an axis that is perpendicular to the substrate surface. In typical examples, a linear polarizer is situated to provide a linear SOP to the polarization convertor.

Systems comprise a THz radiation source situated to provide THz radiation and a rotatable THz polarization convertor situated to receive the THz radiation from the THz radiation source and to direct polarization converted THz radiation in an RCP and a LCP to a sample. A THz radiation detector is situated to receive the polarization converted THz radiation from the sample and produce a corresponding detector signal. A signal processor is coupled to the THz radiation detector to identity circular dichroism in the sample based on the detected polarization converted THz radiation from the sample. In still further examples, the rotatable polarization convertor is operable to rotate at a frequency $\Omega_P$ and the signal processor is configured to identity circular dichroism in the sample based on a portion of detector signal associated with a frequency $2\Omega_P$. In some alternatives, the THz radiation source includes a pulsed laser situated to produce a pulsed laser beam, a beam splitter situated to direct a first portion of the laser beam to a variable delay, and then to the THz radiation detector. A THz target is situated to receive a second portion of the laser beam to produce the THz radiation that is directed to the sample. An optical chopper modulates the second portion of the laser beam at a chopper frequency $\Omega_C$, so that the corresponding THz radiation is modulated at frequency $\Omega_C$, enabling THz time-domain measurements. A first lock-in amplifier is coupled to receive the detector signal and a reference signal based on the chopper frequency $\Omega_C$ and a second lock-in amplifier is situated to receive an output from the first lock-in amplifier and a reference signal at the frequency $2\Omega_P$ and direct an output signal to the signal processor to identity circular dichroism in the sample.

The foregoing and other features and advantages will become more apparent from the following detailed description, which proceeds with reference to the accompanying figures.

BRIEF DESCRIPTION OF THE DRAWINGS

FIG. 1A is an SEM image of a portion of a metasurface that can be used in a terahertz (THz) circular polarization modulator.

FIG. 1B is perspective view of a metasurface such as shown in FIG. 1A.

FIG. 1C is a graph of power spectra for right-handed circular polarization (RCP) and left-handed circular polarization (LCP) produced with a surface such as shown in FIGS. 1A-1B. Dashed curves are obtained from numerical simulations, and solid curves are obtained from experiments.

FIG. 1D illustrates the degree of circular polarization obtainable from a device such as shown in FIGS. 1A-1B.

FIGS. 1E-1F illustrate rotation of an input linear state of polarization (SOP) to produce right-handed circular polarization (RCP) and left-handed circular polarization (LCP) based on a rotation of the metasurface such as shown in FIGS. 1A-1B.

FIGS. 2A-2B are graphs illustrating amplitude and phase of reflections for a linear SOP that is parallel or perpendicular, respectively, to a major axis of the metasurface of FIGS. 1A-1B.

FIG. 3A describes the reflected left-handed and right-handed circularly polarized THz fields from a device such as shown in FIGS. 1A-1B, as a function of time when the device is rotated at frequency $\Omega$.

FIG. 3B describes the transmitted THz fields through a sample with absorption $\alpha_L$ and $\alpha_R$ for left-handed and right-handed circular polarizations, and $\beta_x$ and $\beta_y$ for x and y linear polarizations, respectively.

FIGS. 9A-9D illustrate polarization conversion characteristics of devices as such as illustrated in the insets of FIG. 9A.

FIGS. 10A-10B illustrate polarization conversion and degree of circular polarization (DoCP) for polarization convertors having different pillar lengths along a major axis.

FIG. 11A is a schematic of a metasurface unit cell and includes a view in which metallic structures are displaced from a dielectric pillar to reveal the details of the metasurface unit cell.

FIG. 11B is a scanning electron microscopy (SEM) micrograph of a fabricated metasurface structure, in accordance with embodiments of the present disclosure.

FIG. 11C is a close-up view of the SEM micrograph of FIG. 11B, in accordance with embodiments of the present disclosure.

μm, P=100 μm, and L=110 μm, in accordance with embodiments of the present disclosure.

Figures 11D, 11E, 11F, 11G, 11H, 11I:
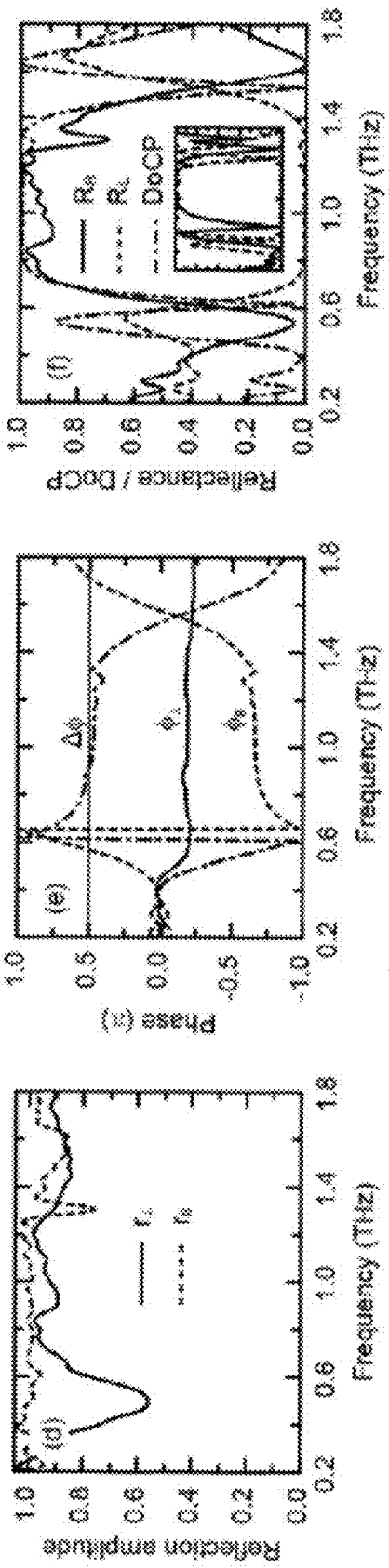
FIG. 11D illustrates measured reflection amplitude under normal incidence for a metasurface with w=16 μm, h=44

FIG. 11E illustrates phase spectra under normal incidence for a metasurface with w=16 μm, h=44 μm, P=100 μm, and L=110 μm, in accordance with embodiments of the present disclosure.

FIG. 11F illustrates intensity spectra of right-handed and left-handed circular polarization components of reflection extraction from linear polarization reflection measurements, as well as the degree of circular polarization (DoCP), in accordance with embodiments of the present disclosure. The inset is the DoCP for metasurface samples with L=100 μm (solid curve) and 120 μm (dashed curve).

FIG. 11G illustrates reflection amplitude resulting from full-wave numerical simulations, in accordance with embodiments of the present disclosure.

FIG. 11H illustrates phase spectra resulting from full-wave numerical simulations, in accordance with embodiments of the present disclosure.

FIG. 11I illustrates intensity spectra of right-handed and left-handed circular polarization components, as well as the DoCP, resulting from full-wave numerical simulations, in accordance with embodiments of the present disclosure.

Figure 12A:
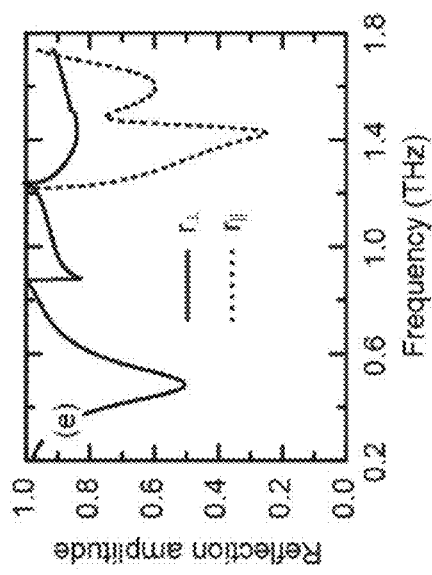

FIG. 12A illustrates simulated reflection amplitude for a perpendicular component at a cut-wire and metal slot interfaces, in accordance with embodiments of the present disclosure. The inset is a schematic of the cut-wire and metal slot interfaces.

Figure 12C:
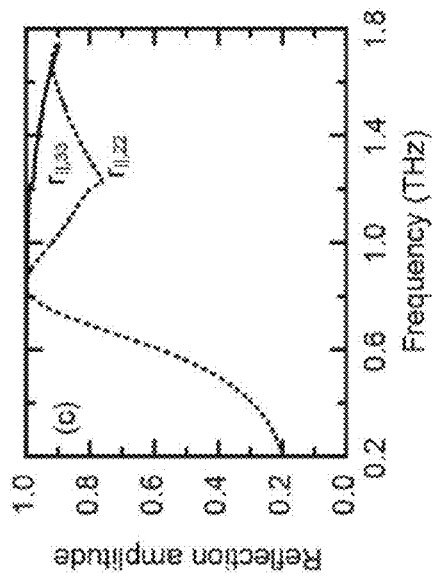
Figure 12E:
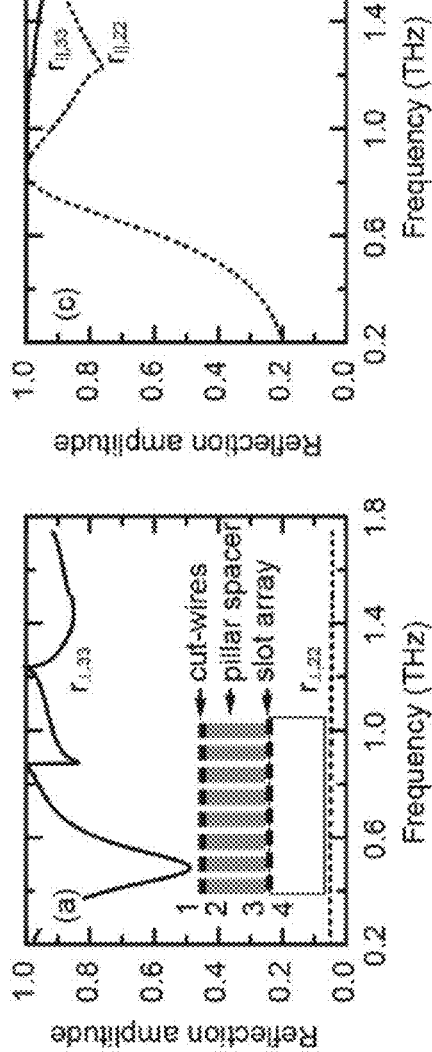
Figure 12B:
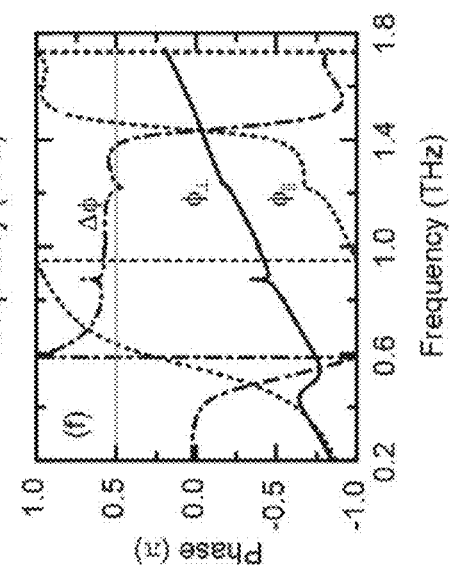

FIG. 12B illustrates simulated phase spectra for a perpendicular component at cut-wire and metal slot interfaces, as well as the propagation phase between them, in accordance with embodiments of the present disclosure.

FIG. 12C illustrates simulated reflection amplitude for a parallel field component at a cut-wire and metal slot interfaces, in accordance with embodiments of the present disclosure.

Figure 12D:
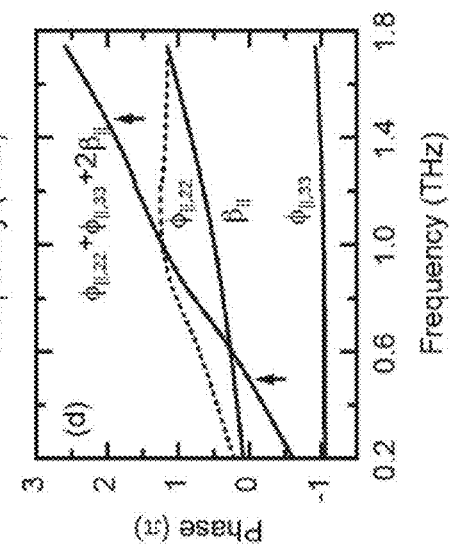

FIG. 12D illustrates simulated phase spectra for a parallel field component at a cut-wire and metal slot interfaces, as well as the propagation phase between them and round phase accumulation, in accordance with embodiments of the present disclosure. The two arrows indicate round propagation phase values of 0 and 2n.

FIG. 12E illustrates a calculated reflection amplitude using a multireflection model, in accordance with embodiments of the present disclosure.

Figure 12F:
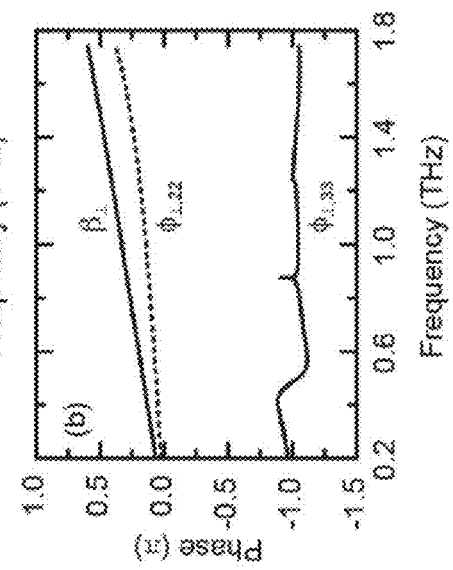

FIG. 12F is a calculated phase spectra for perpendicular and parallel field components, together with their phase difference, in accordance with embodiments of the present disclosure.

Figure 13A:
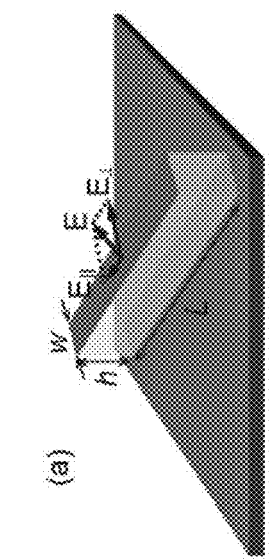

FIG. 13A is a schematic of a unit cell of a metasurface structure using a continuous metal reflector, array of metal cut-wires, and dielectric pillar spacer, in accordance with embodiments of the present disclosure.

Figure 13C:
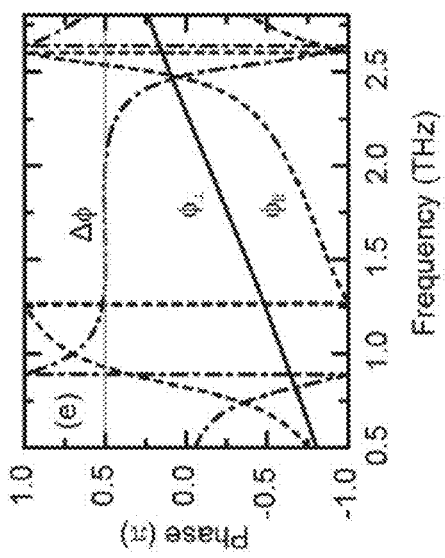
Figure 13E:
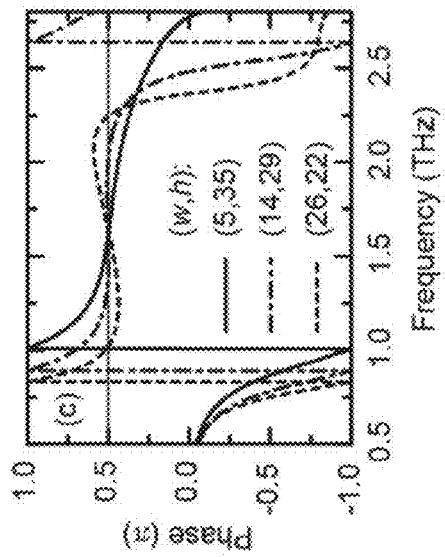
Figure 13B:
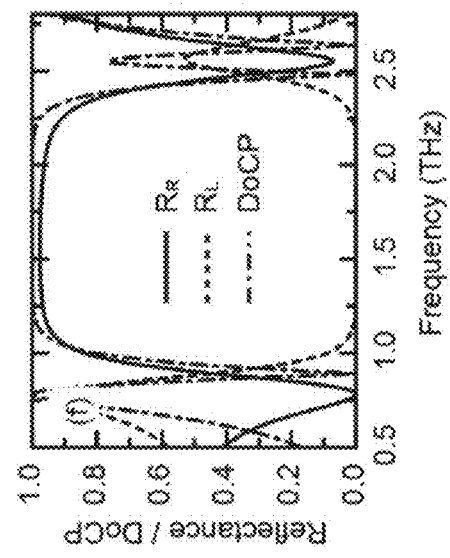

FIG. 13B illustrates phase dispersion obtained from two-mode coupled mode theory, in accordance with embodiments of the present disclosure.

FIG. 13C illustrates dispersion of Δϕ obtained from full-wave numerical simulations using polyimide pillars and different sets of geometric dimensions, showing a positive, negative, and flat response at off-resonance frequencies, in accordance with embodiments of the present disclosure.

Figure 13D:
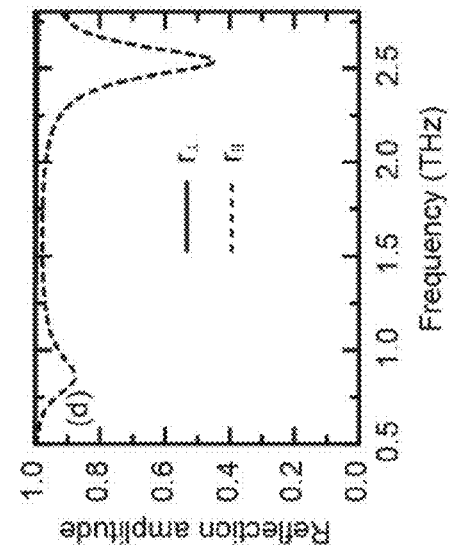

FIG. 13D illustrates simulated reflection amplitude of a metasurface structure with w=14 μm and h=29 μm (Period=110 μm and L=110 μm), producing high reflection over a broad bandwidth, in accordance with embodiments of the present disclosure.

FIG. 13E illustrates simulated phase of a metasurface structure with w=14 μm and h=29 μm (Period=110 μm and L=110 μm), producing constant phase response over a broad bandwidth, in accordance with embodiments of the present disclosure.

Figure 13F:
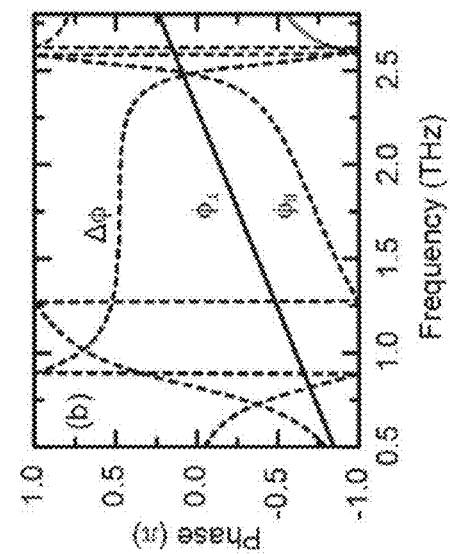

FIG. 13F illustrates extracted circular polarization components and degree of circular polarization, in accordance with embodiments of the present disclosure.

Figure 14A:
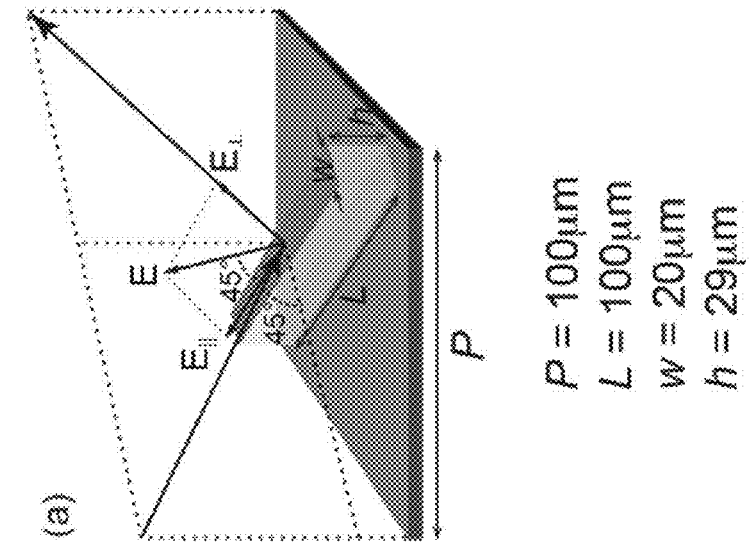

FIG. 14A is a schematic of a reflective metasurface unit cell, along with incident and reflective beams at 45 degrees with respect to the surface normal, where the plane of incidence is perpendicular to the major principal axis of the structure, and the incidence linear polarization is at 45 degrees with respect to the plane of incidence, in accordance with embodiments of the present disclosure.

Figure 14B:
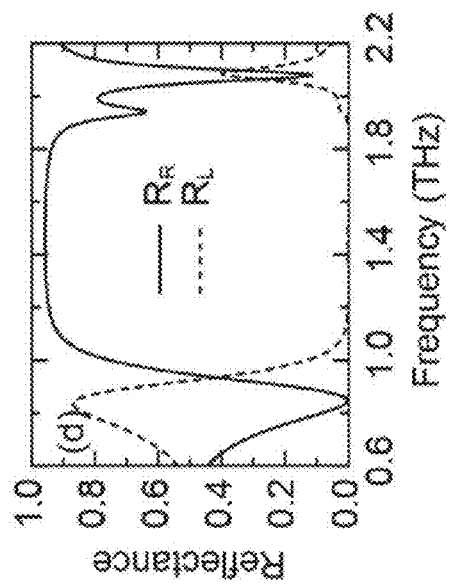

FIG. 14B illustrates amplitude reflectivity for the parallel and perpendicular field components, in accordance with embodiments of the present disclosure.

Figure 14C:
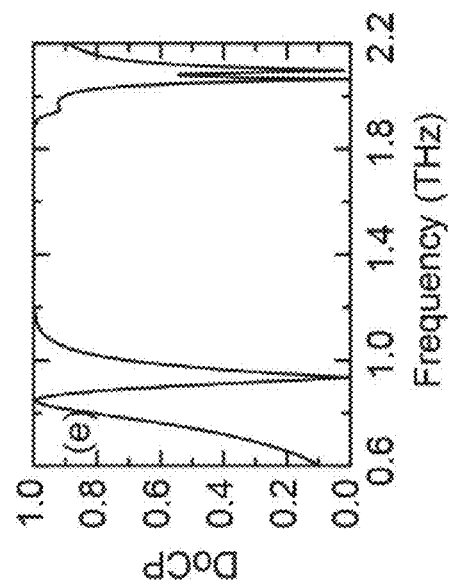

FIG. 14C illustrates phase and phase difference for the parallel and perpendicular field components, in accordance with embodiments of the present disclosure.

Figure 14D:
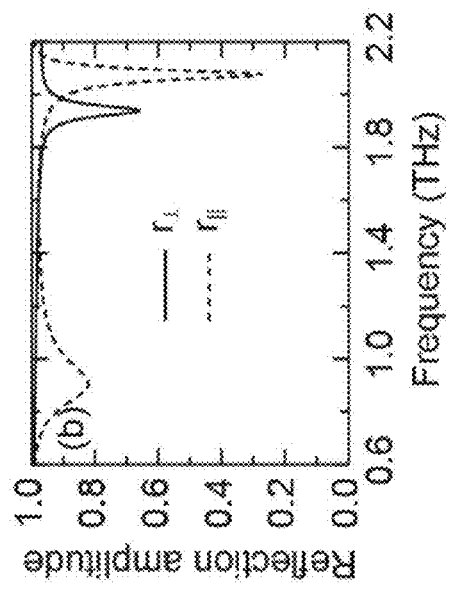

FIG. 14D illustrates circular polarization components of the reflection, in accordance with embodiments of the present disclosure.

Figure 14E:
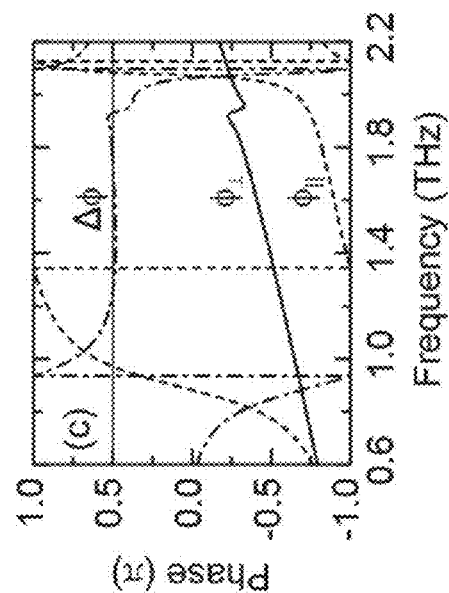

FIG. 14E illustrates degree of circular polarization of reflection when incident linear polarization is at 45 degrees with respect to the plane of incidence, in accordance with embodiments of the present disclosure.

Figure 15D:
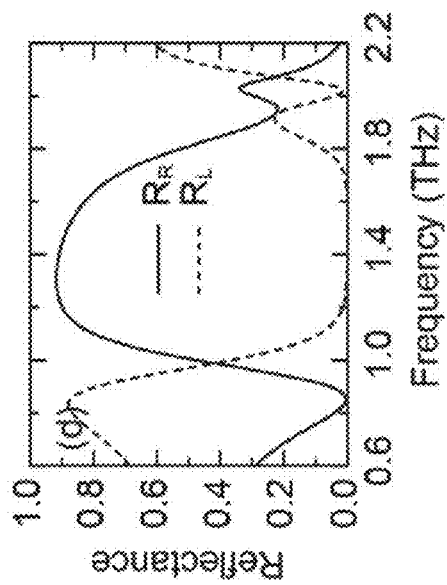
Figure 15E:
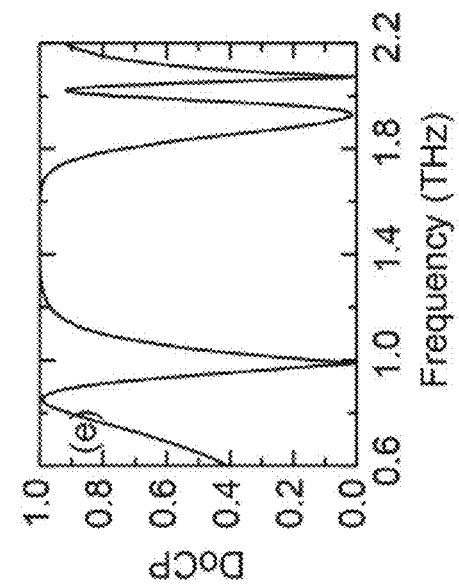
Figure 15B:
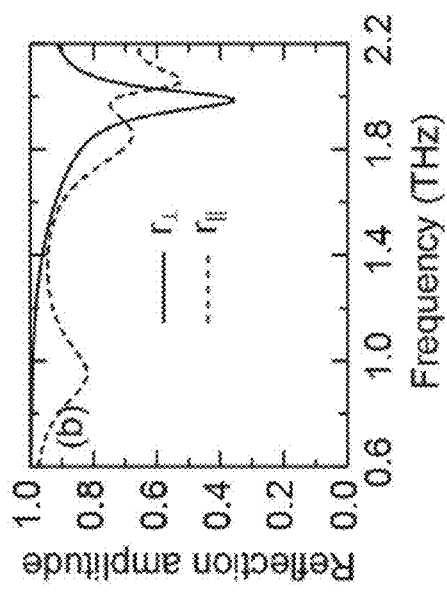
Figure 15C:
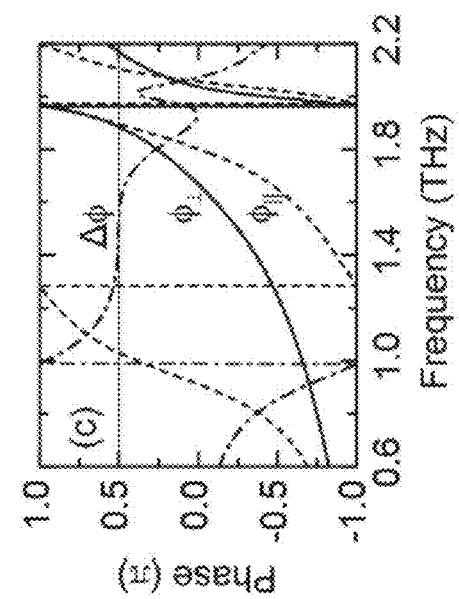
Figure 15A:
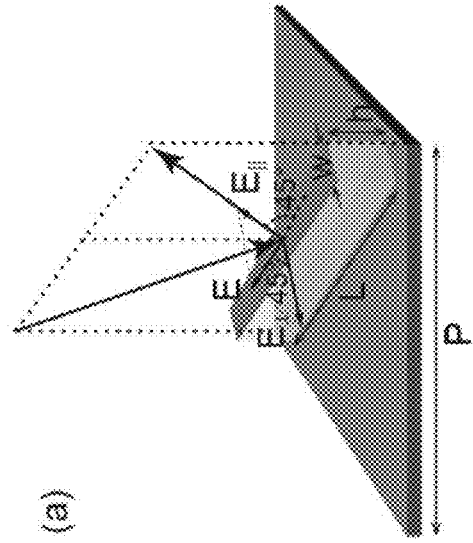

FIG. 15A is a schematic of a reflective metasurface unit cell, along with incident and reflective beams at 45 degrees with respect to the surface normal, where the plane of incidence is parallel to the major principal axis of the structure, and the incidence linear polarization is at 45 degrees with respect to the plane of incidence, in accordance with embodiments of the present disclosure.

FIG. 15B illustrates amplitude reflectivity for the parallel and perpendicular field components, in accordance with embodiments of the present disclosure.

FIG. 15C illustrates phase and phase difference for the parallel and perpendicular field components, in accordance with embodiments of the present disclosure.

FIG. 15D illustrates circular polarization components of the reflection, in accordance with embodiments of the present disclosure.

FIG. 15E illustrates degree of circular polarization of reflection when incident linear polarization is at 45 degrees with respect to the plane of incidence, in accordance with embodiments of the present disclosure.

Figure 16A:
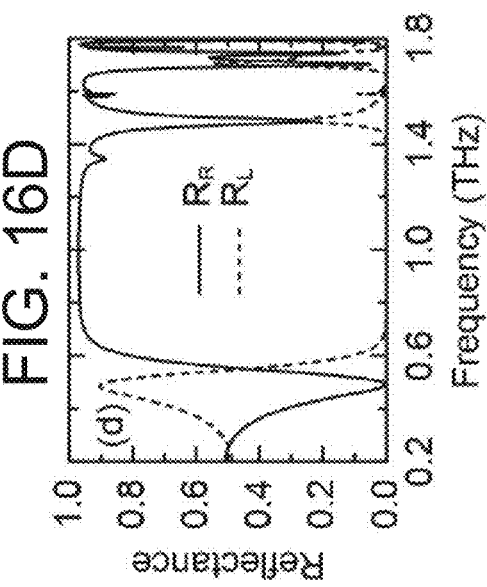

FIG. 16A is a schematic of a reflective metasurface unit cell, along with incident and reflective beams at 45 degrees with respect to the surface normal, where the plane of incidence is perpendicular to the major principal axis of the structure, and the incidence linear polarization is at 45 degrees with respect to the plane of incidence, in accordance with embodiments of the present disclosure.

Figure 16B:
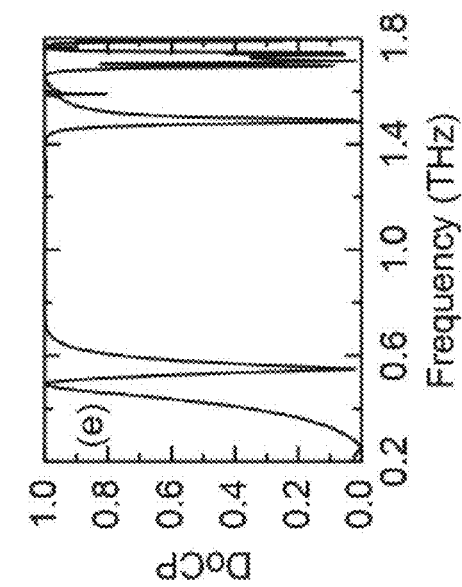

FIG. 16B illustrates amplitude reflectivity for the parallel and perpendicular field components, in accordance with embodiments of the present disclosure.

Figure 16C:
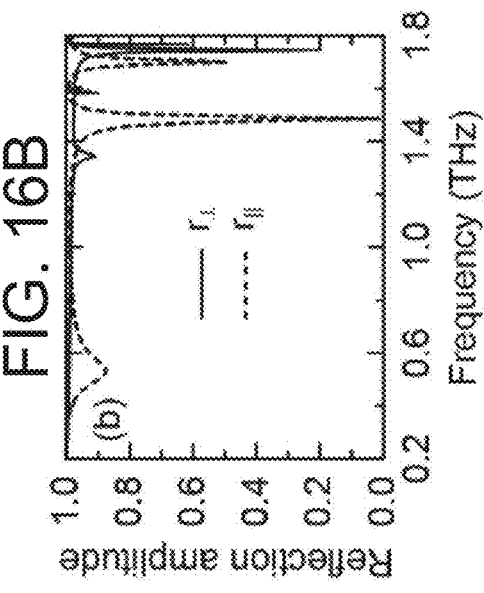

FIG. 16C illustrates phase and phase difference for the parallel and perpendicular field components, in accordance with embodiments of the present disclosure.

Figure 16D:
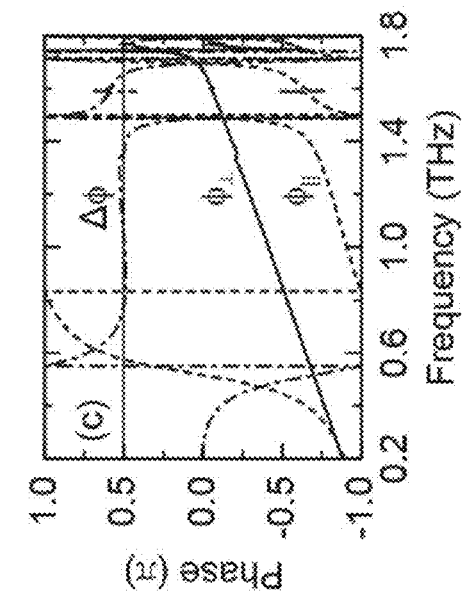

FIG. 16D illustrates circular polarization components of the reflection, in accordance with embodiments of the present disclosure.

Figure 16E:
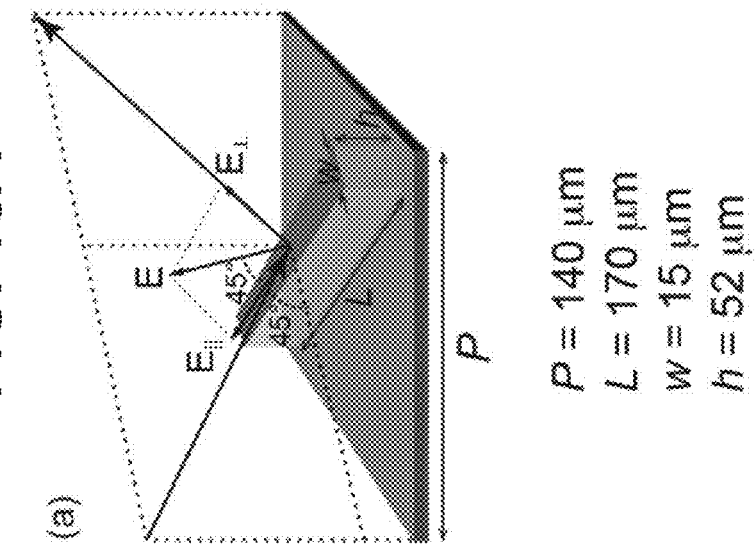

FIG. 16E illustrates degree of circular polarization of reflection when incident linear polarization is at 45 degrees with respect to the plane of incidence, in accordance with embodiments of the present disclosure.

FIG. 17A is a schematic of a reflective metasurface unit cell, along with incident and reflective beams at 35 degrees with respect to the surface, where the plane of incidence is perpendicular to the major principal axis of the structure, and the incidence linear polarization is at 45 degrees with respect to the plane of incidence, in accordance with embodiments of the present disclosure.

FIG. 17B illustrates amplitude reflectivity for the parallel and perpendicular field components, in accordance with embodiments of the present disclosure.

FIG. 17C illustrates phase and phase difference for the parallel and perpendicular field components, in accordance with embodiments of the present disclosure.

FIG. 17D illustrates circular polarization components of the reflection, in accordance with embodiments of the present disclosure.

FIG. 17E illustrates degree of circular polarization of reflection when incident linear polarization is at 45 degrees with respect to the plane of incidence, in accordance with embodiments of the present disclosure.

Figure 18A:
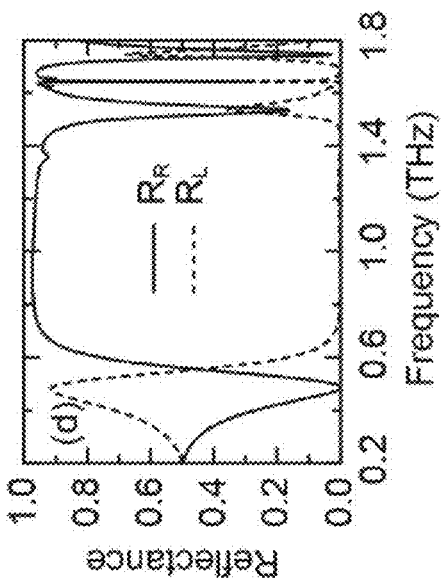

FIG. 18A is a schematic of a reflective metasurface unit cell, along with incident and reflective beams at 55 degrees with respect to the surface, where the plane of incidence is perpendicular to the major principal axis of the structure, and the incidence linear polarization is at 45 degrees with respect to the plane of incidence, in accordance with embodiments of the present disclosure.

Figure 18B:
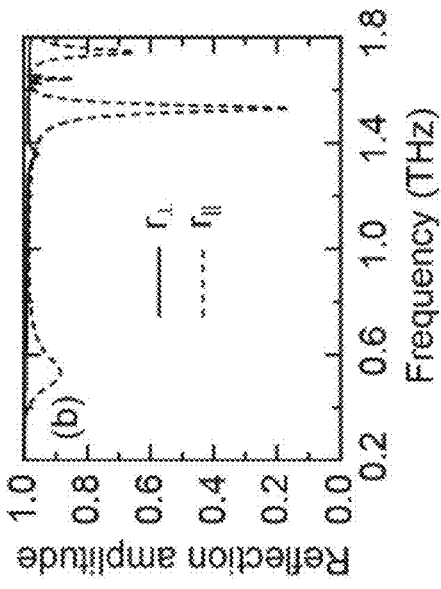

FIG. 18B illustrates amplitude reflectivity for the parallel and perpendicular field components, in accordance with embodiments of the present disclosure.

Figure 18D:
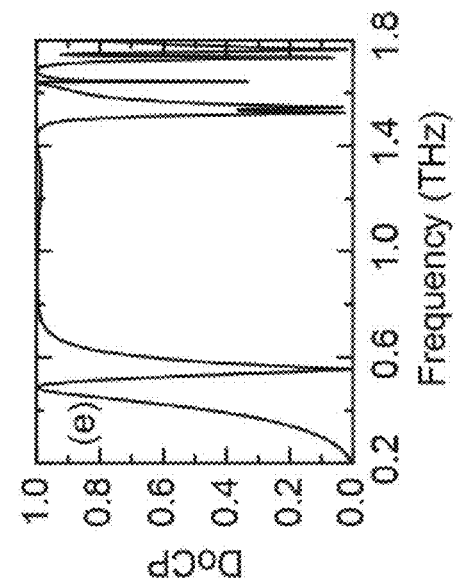
Figure 18C:
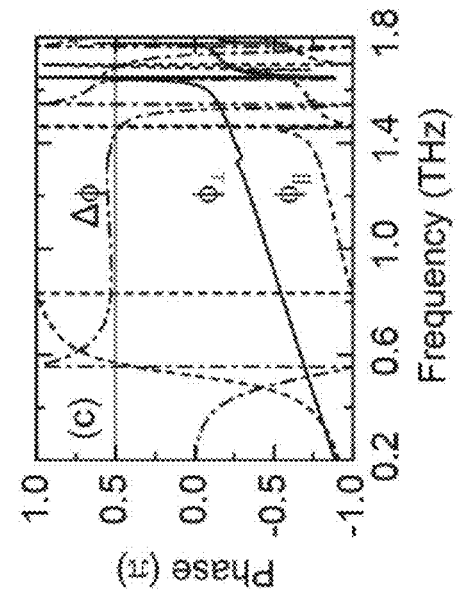

FIG. 18C illustrates phase and phase difference for the parallel and perpendicular field components, in accordance with embodiments of the present disclosure.

FIG. 18D illustrates circular polarization components of the reflection, in accordance with embodiments of the present disclosure.

Figure 18E:
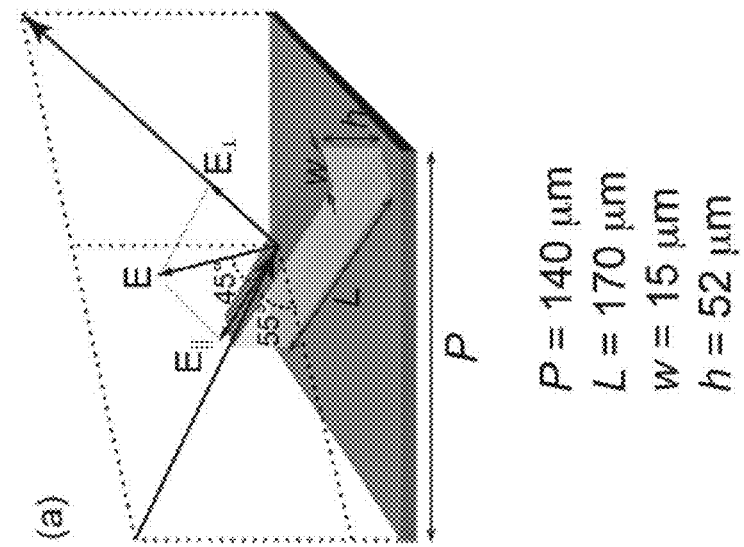

FIG. 18E illustrates degree of circular polarization of reflection when incident linear polarization is at 45 degrees with respect to the plane of incidence, in accordance with embodiments of the present disclosure.

Figure 19:
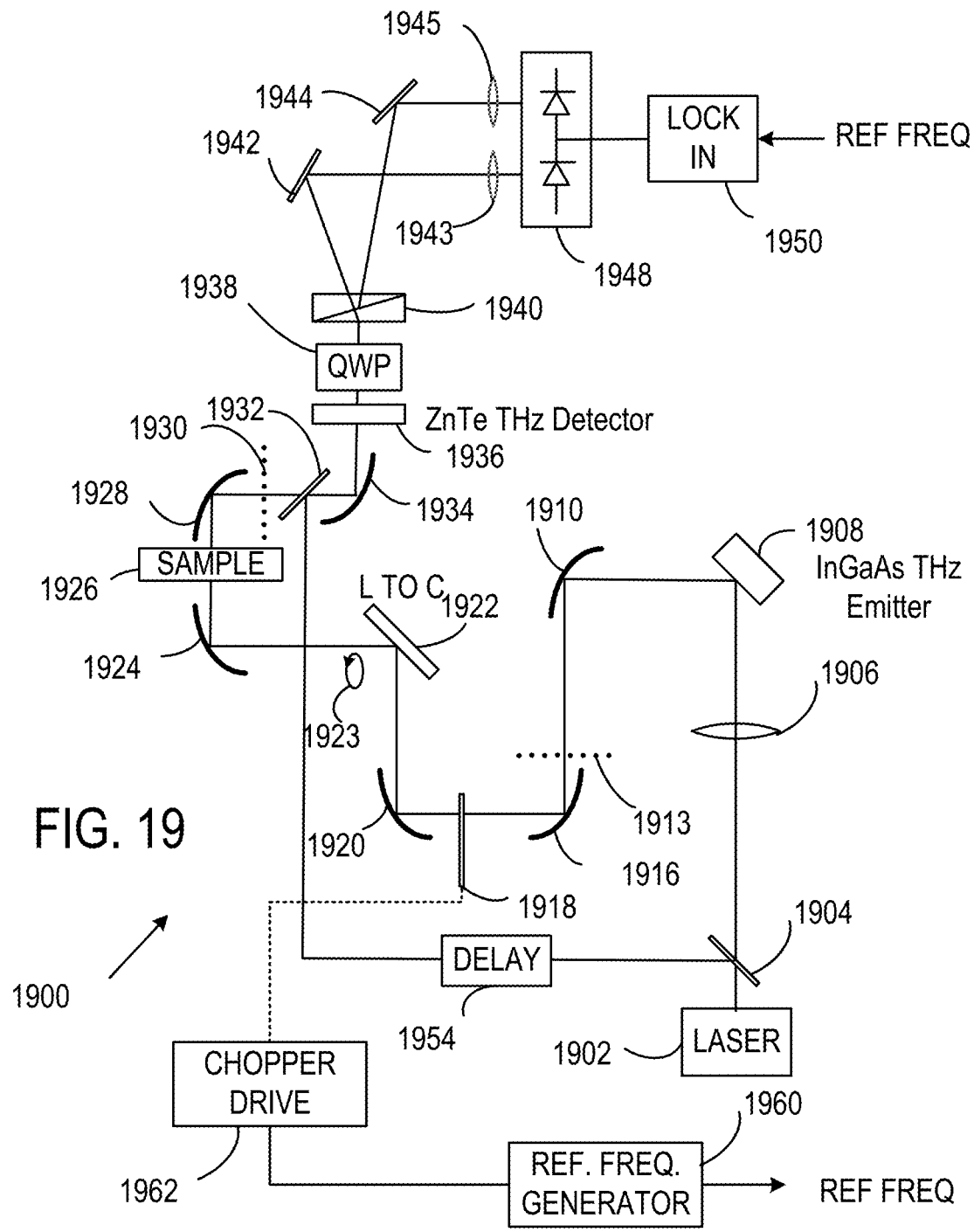

FIG. 19 is a schematic of a terahertz circular dichroism spectrometer (THz-CDS) based on time-domain spectroscopy, in accordance with embodiments of the present disclosure.

Figure 20:
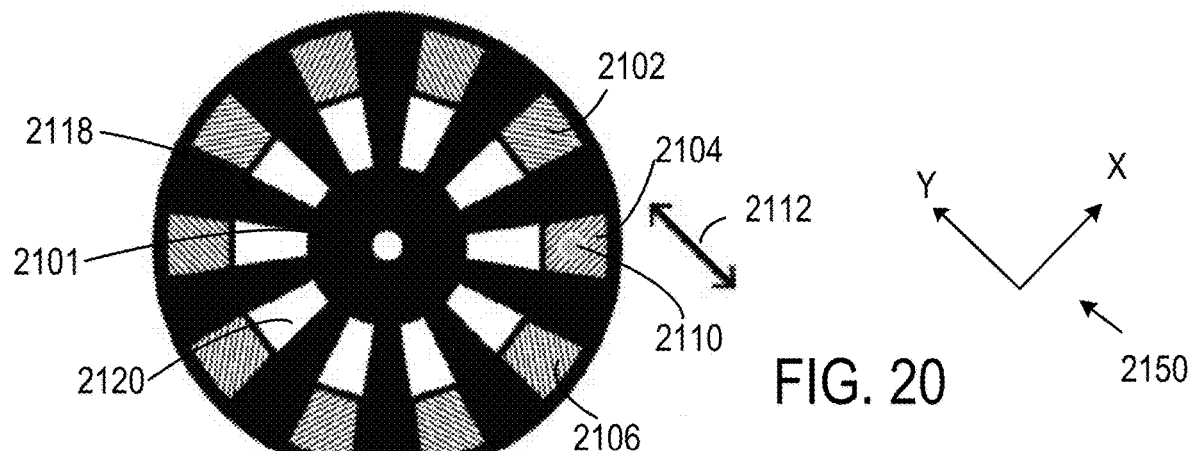
Figure 21:
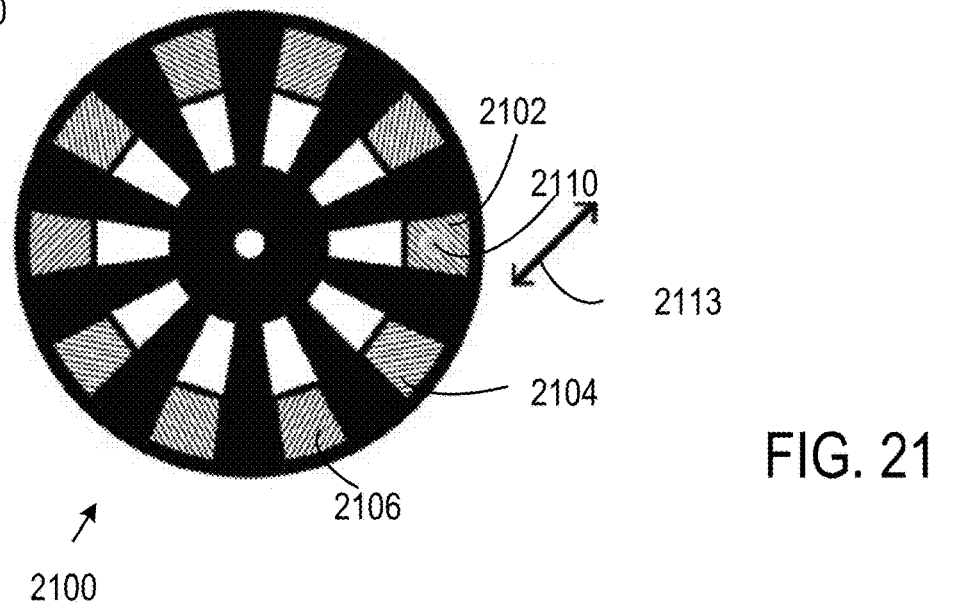

FIGS. 20-21 illustrate a THz linear polarization modulator based on an optic chopper and metal wire grids, in accordance with embodiments of the present disclosure.

Figure 22B:
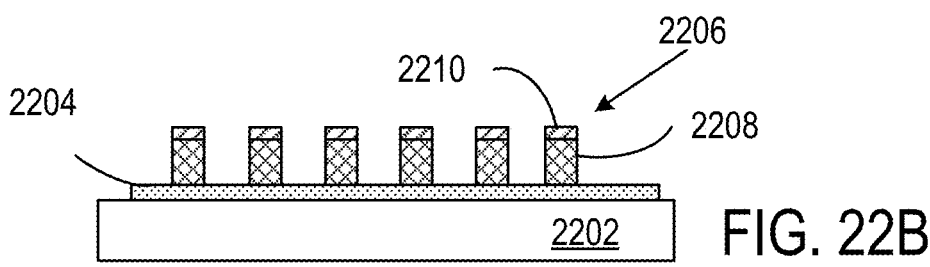
Figure 22A:
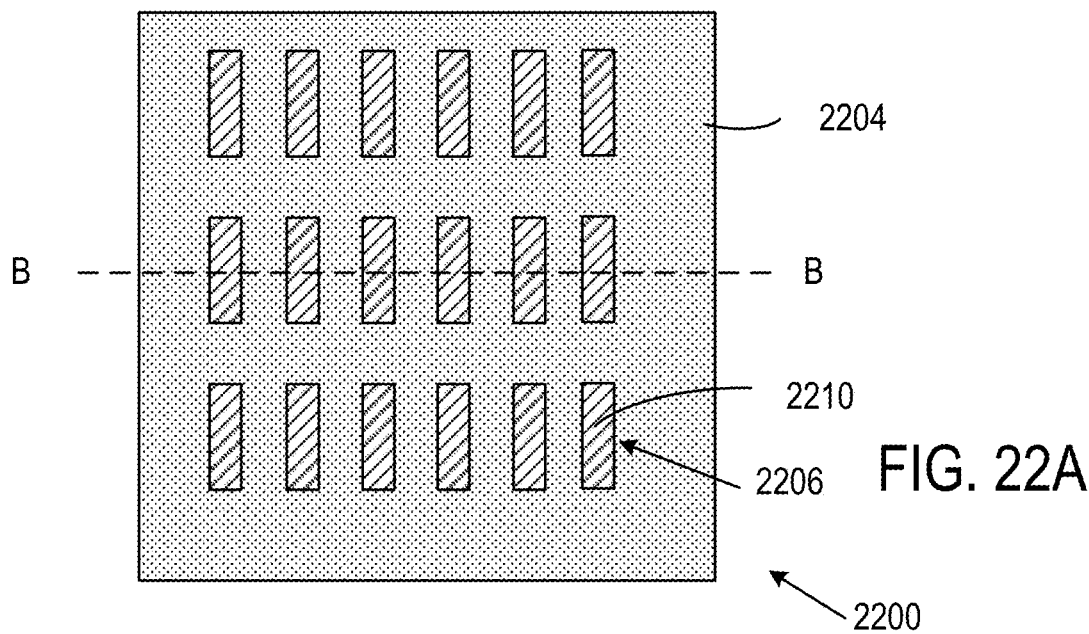

FIGS. 22A-22B illustrate a THz device that includes a spacer layer.

Figure 23:
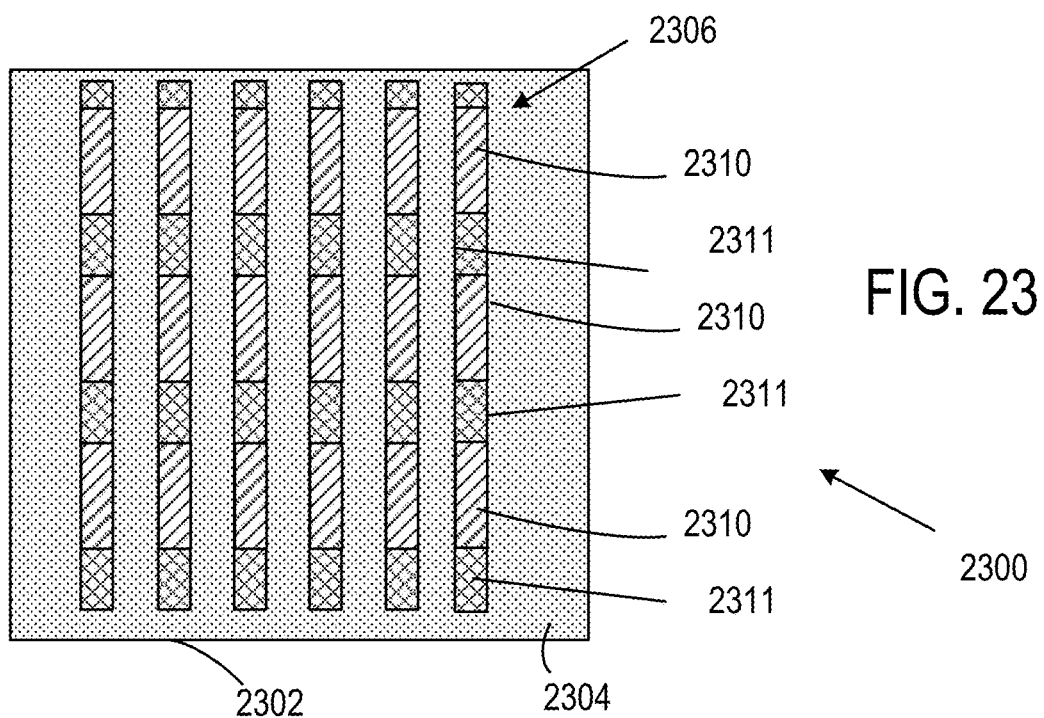

FIG. 23 illustrates a representative THz device that includes a one dimensional array of pillars having a periodic conductive coating.

Figures 24A, 24B:
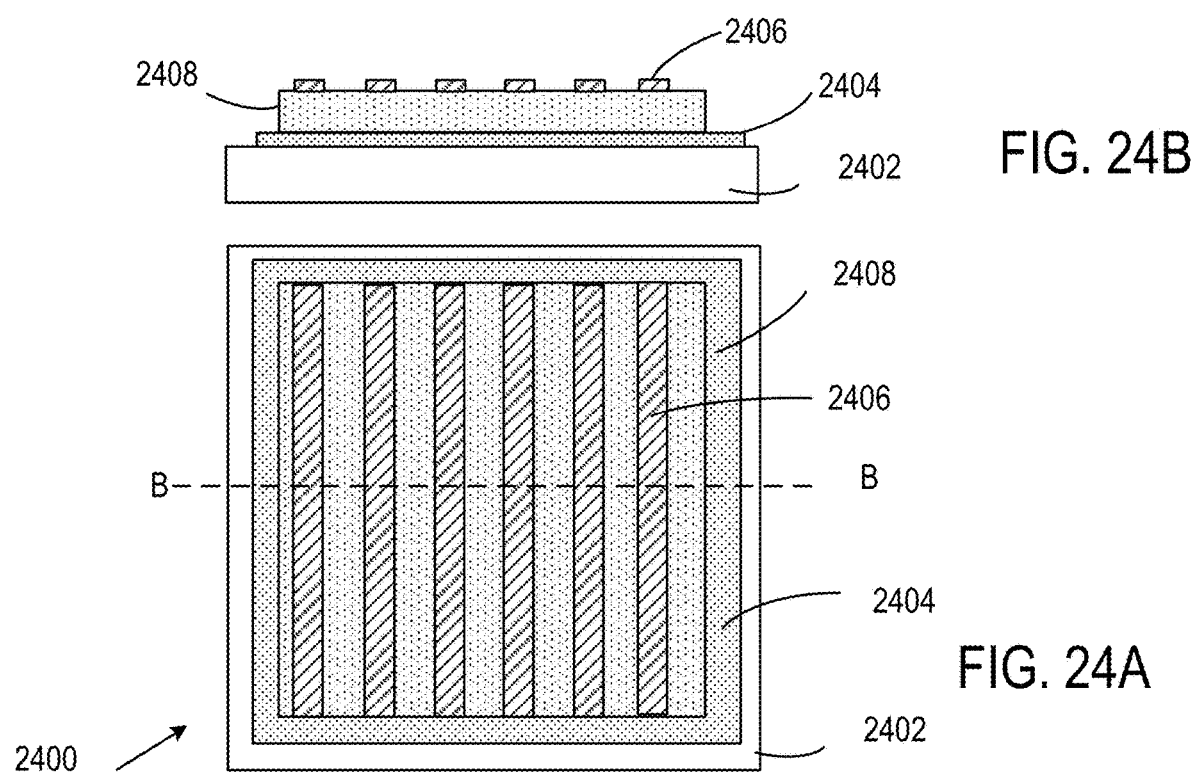

FIGS. 24A-24B illustrate a representative THz device based on a one dimensional array of pillars.

Figure 25:
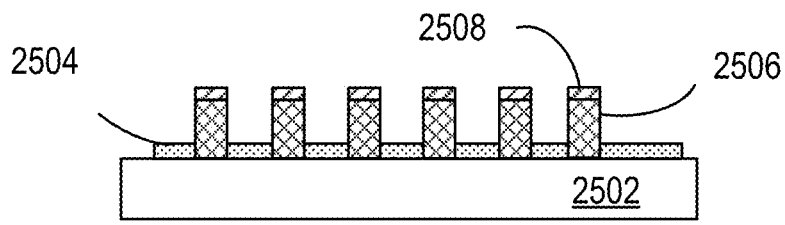

FIG. 25 illustrates a THz device having pillars defined in a spacer layer formed on a substrate surface.

Figure 26:
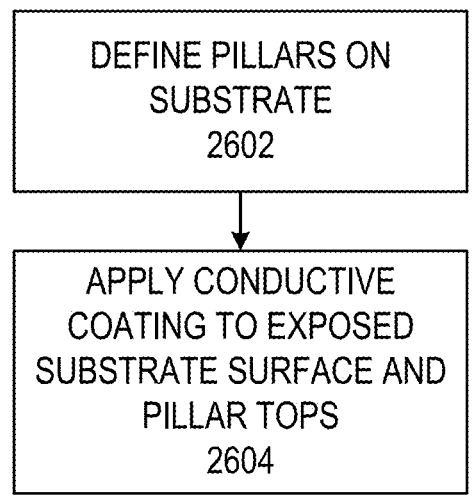

FIG. 26 illustrates a representative method of manufacture.

Figure 27:
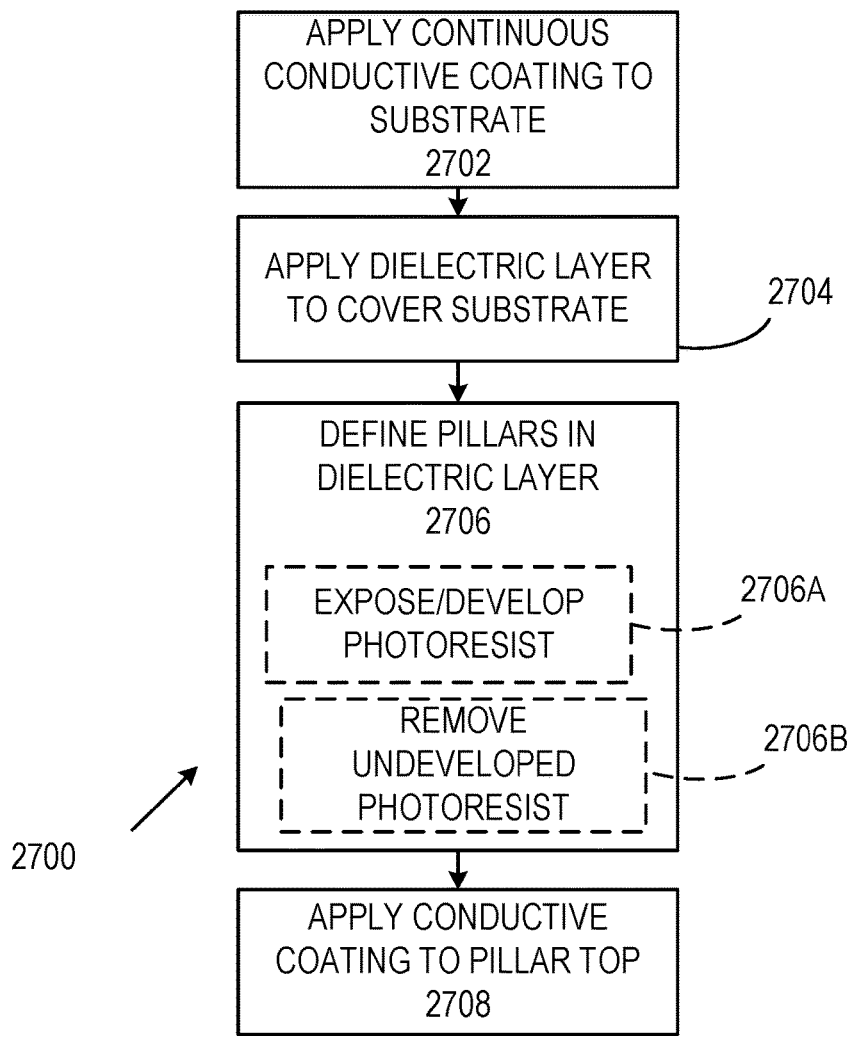

FIG. 27 illustrates a representative method of manufacturing a THz polarization convertor using a spacer layer formed on a substrate.

Figure 28:
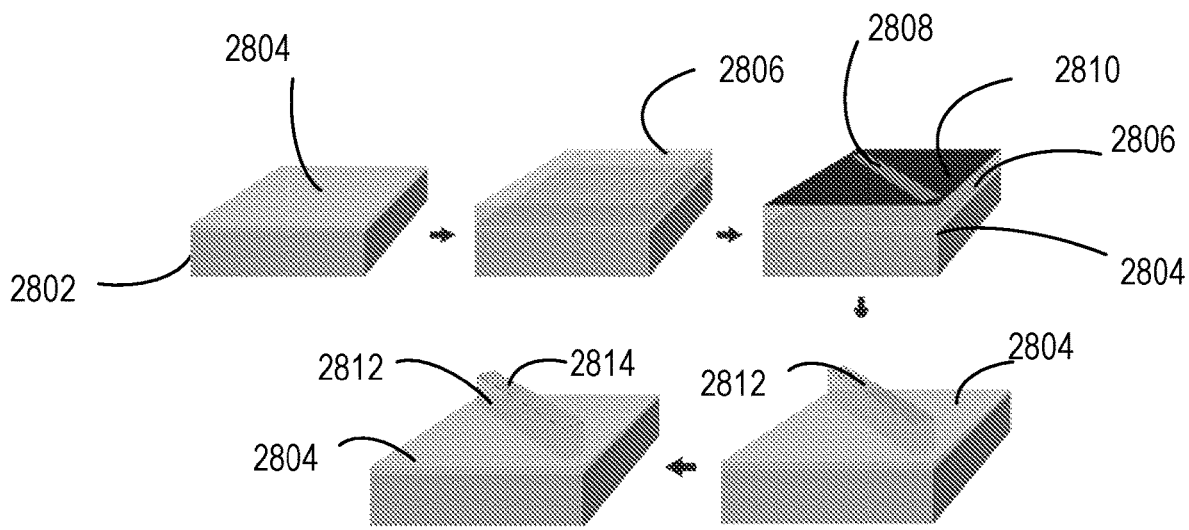

FIG. 28 illustrates a substrate processed according to the method of FIG. 27.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, "signal" refers to a time varying electrical current, voltage, or phase, or a time varying optical field, field amplitude, optical power, phase, state of polarization (SOP) or other electrical or optical quantity. "Signal" also refers to digital representations of such signals, and data in such digital representations can be communicated serially or in parallel, or stored in a non-transitory computer readable medium, such as random access memory, a hard disk, a flash drive, or other device. Data can be stored locally or remotely and communicated for evaluation and processing via a local area network or a wide area network.

Disclosed herein are methods and apparatus that provide THz metasurface circular polarization modulation for THz frequencies over a broad bandwidth. Typical frequency ranges are from 0.05 to 20 THz, 0.5 to 10 THz, 0.1 to 10 THz, 0.1 and 5 THz, 0.3 to 3 THz, or other frequency ranges. In some cases, THz frequencies are those between 0.3 THz and 10 THz (wavelengths between about 1 mm and 30 μm). In some examples, THz metasurface modulators are included in a broadband THz time-domain spectroscopy (THz-TDS) system. In some cases, a dual-lock-in detection scheme is used to enable the extraction of a broadband CD signal.

In some examples, THz devices include multiple structures that extend from a substrate, typically as pillars that extend from a planar surface. Such pillars are generally aligned along an axis, and pillar cross-sections parallel to the surface have length to width aspect ratios of 2:1 or greater such as 4:1, 5:1, or 10:1. In some applications, conversion of THz SOP between linear and circular SOPs (left circular or right circular) is needed and convertors for linear to circular SOP conversion are described for convenient illustration, but similar devices can be provided for conversion among linear, circular, and elliptical SOPs. In practical applications, the THz SOP conversion devices include parallel reflective surfaces with a birefringent element situated between the reflective surfaces. The birefringent element can be a birefringent material such as a crystalline material (sapphire, lithium niobate, liquid crystals), and stressed or stretched materials such as polymers. Alternatively, the birefringent element can exhibit form birefringence such as produced by the pillars in the examples discussed below. The parallel reflective surfaces serve as terminations of a Fabry-Perot cavity to produce multiple reflections so that incoming THz radiation experiences multiple interactions with the birefringent element to permit linear to circular SOP conversion.

Examples are described with reference to rectangular conductive regions but other shapes such as ovoids, ellipses, polygons, or other can be used, and each will have associated effective lengths and widths for interaction with THz radiation. In addition, patterned conductive regions are illustrated on surfaces of pillars or other structures formed on substrates, but can be formed on substrates as well.

Example 1 FIGS. 1A-1B illustrate a reflective THz linear-to-circular polarization convertor 100 that includes an array of rectangular silicon pillars such as representative pillar 102 that can be etched from a silicon substrate 104. The pillars are arranged with long directions along a structure major axis 105. A gold film 106 or other conductive film is situated on a top surface 108 of each pillar and a surface 110 of the silicon substrate 104, but not on a pillar sidewall 112.

FIGS. 1E-1F illustrate a beam incident along an axis 120 to the THz linear-to-circular polarization convertor 100 and having electric field vector E that is at 45 degrees with respect to the structure major axis 105. In both FIGS. 1E-1F, the electric field vector is along a y-axis of a right handed Cartesian coordinate system 150, but the THz linear-to-circular polarization convertor 100 is rotated. The structure major axis 105 is shown in FIG. 1E as axis 105A in an xy plane and extending between +x and +y-axes while in FIG. 1F the structure major axis 105 is shown as axis 105B in the xy plane but extending between +x and −y-axes. FIG. 1C illustrates intensity in each of the two circular states of polarization (SOPs), i.e., right-handed circular (RCP) and left-handed circular (LCP) when the incident THz wave is linearly polarized at 45° with respect to the structure major axis 105. Incident linearly polarized radiation is converted to RCP with a conversion efficiency of greater than 80%, over a frequency range between 0.63 THz and 1.33 THz, i.e., a fractional bandwidth of 70%. Intensity in the LCP is negligible. The degree of circular polarization DoCP defined as DoCP=|($I_{RCP}$−$I_{LCP}$)|/($I_{RCP}$+$I_{LCP}$) is plotted as a function of THz frequency in FIG. 1D and is nearly unity over the frequency range shown in FIG. 1D. Rotation of the THz linear-to-circular polarization convertor 100, or rotation of the incident THz linear polarization by 90 degree thus permits production of either LCP or RCP.

Example 2. General Considerations for THz Circular Polarization Modulators

In THz metasurface circular polarization modulators, structural anisotropies such as alignment of the rectangular pillars of FIG. 1B along an axis result in field components parallel ($E_∥$) and perpendicular ($E_⊥$) to a structure major axis experiencing birefringent response from the anisotropic metasurface. Both components can have high reflection amplitudes, while their phase difference $\Delta\phi=|\phi_∥-\phi_⊥|$ is about π/2 over a wide frequency range, as shown by the numerical simulation results in FIGS. 2A-2B. These two conditions assure highly efficient linear-to-circular polarization conversion, which is plotted as dashed curves for numerical simulations and solid curves for experimental measurements in FIGS. 1C-1D. Importantly, rotating by 90 degrees the metasurface or the incident linear polarization, the same metasurface converts the incident THz waves to LCP (see FIGS. 1E-1F). By mechanically rotating the metasurface, or a method to rotate the incident linear polarization, THz waves can be modulated between right- and left-handed circular polarizations. Metasurfaces such as illustrated in FIG. 1B are conveniently made using silicon substrates because of silicon's low loss in the THz frequency range. Fabrication is based on photolithographic structure patterning, deep reactive ion etching, and directional metal film deposition, but other substrates and materials can be used to prepare suitable pillars.

Example 3. General Considerations for CD Spectroscopy

Low THz photon energy and the typically low power THz sources make it a challenge to directly detect THz photons. For THz-CD applications, a THz spectrum with different frequency components is mixed within the time-domain data, and can include contributions associated with linear birefringence (LB) (from both the SOP modulator and the sample). Any nonlinear crystals or photoconductive antennas used can be polarization sensitive, resulting in an undesirable situation in measuring the absorption difference of left-handed and right-handed circular polarizations. An alternative CD detection scheme is disclosed that can take advantage of broadband THz modulation and time-domain measurements.

After a horizontally polarized (x-direction) incident wave is reflected from a rotating metasurface modulator, the THz field changes continuously from left-handed to right-handed circular polarization through all possible elliptical (including linear) polarization states depending on the rotation angle of the metasurface at a specific time and can be represented mathematically as shown in FIG. 3A, wherein Ω is a rotation frequency of the polarization convertor, t is time, $\tilde{r}_{major}$ and $\tilde{r}_{minor}$ are the complex reflection coefficients when the incident THz field is along the major and minor axes, respectively. The amplitudes of $\tilde{r}_{major}$ and $\tilde{r}_{minor}$ could be slightly different and their phase difference may be not be exactly π/2 (which does not affect the following CD measurements). These are the incident fields to the sample, and FIG. 4A shows the modulated amplitude of the left and right circular polarizations as a function of Ωt even with non-ideal polarization conversion.

When transmitting through a sample with CD and possibly LB (absorption $\alpha_L$ and $\alpha_R$ for LCP and RCP, respectively, and $\beta_x$ and $\beta_y$ for x and y linear polarizations, respectively), the polarization state may be changed, and the THz fields projected to x or y directions are as shown in FIG. 3B. Even without CD and LB, the amplitude of the co-polarized E-field ($E_x^s$) is modulated at its fundamental frequency 2Ω (a frequency that can be used for lock-in detection), as shown in FIG. 4B so it is not well suited for CD measurements. The cross-polarized E-field ($E_y^s$) contains CD information in both terms containing ($\alpha_R-\alpha_L$)

Figures 4A, 4B, 4C, 4D, 4E, 4F:
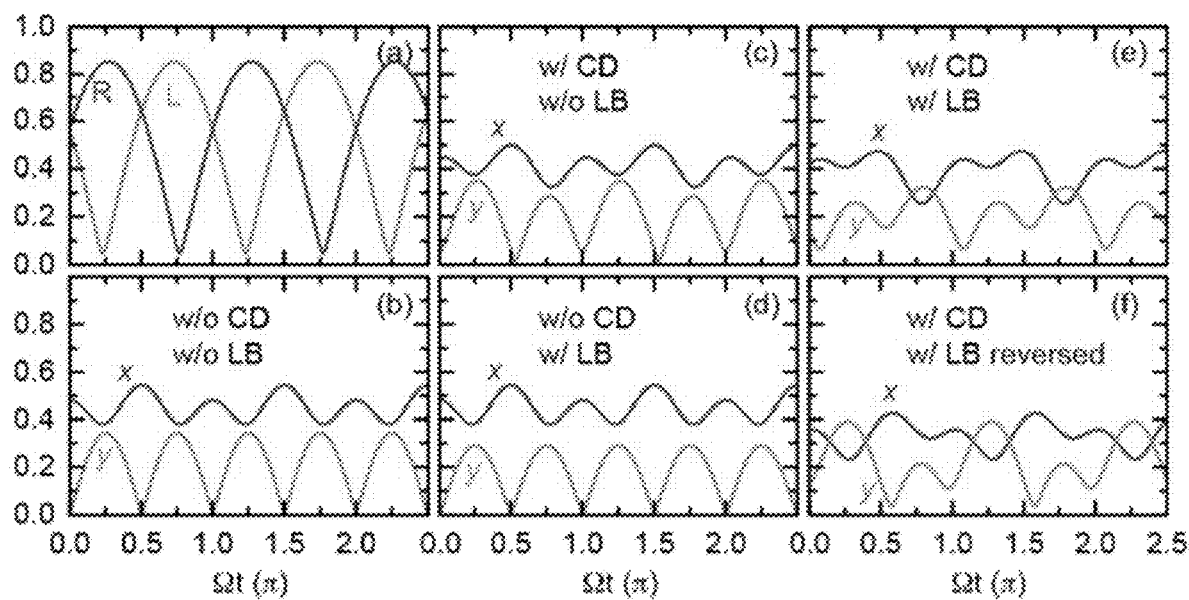
FIGS. 4A-4F illustrate modulations associated with co-polarized and counter-polarized input fields without a sample and with samples that can include circular dichroism (CD) and linear birefringence (LB).

Without CD, the amplitude of $E_y^s$ is modulated at its fundamental frequency 4Ω, but not at 2Ω as shown in FIGS. 4B, 4D. When the sample has a CD response, it is modulated at 2Ω as shown in FIGS. 4C, 4E-4F, and modulation at this frequency can be detected and processed. When the sample has both CD and LB, the situation is more complicated in that both responses are mixed in the detected signal as shown in FIGS. 4E-4F. However, when there is CD response, there is signal modulation associated with $E_y^s$; at a frequency 2Ω; without CD, there is no modulation. Detection of this frequency component permits determination of CD.

Example 4. THz CD Spectrometer

Figure 5:
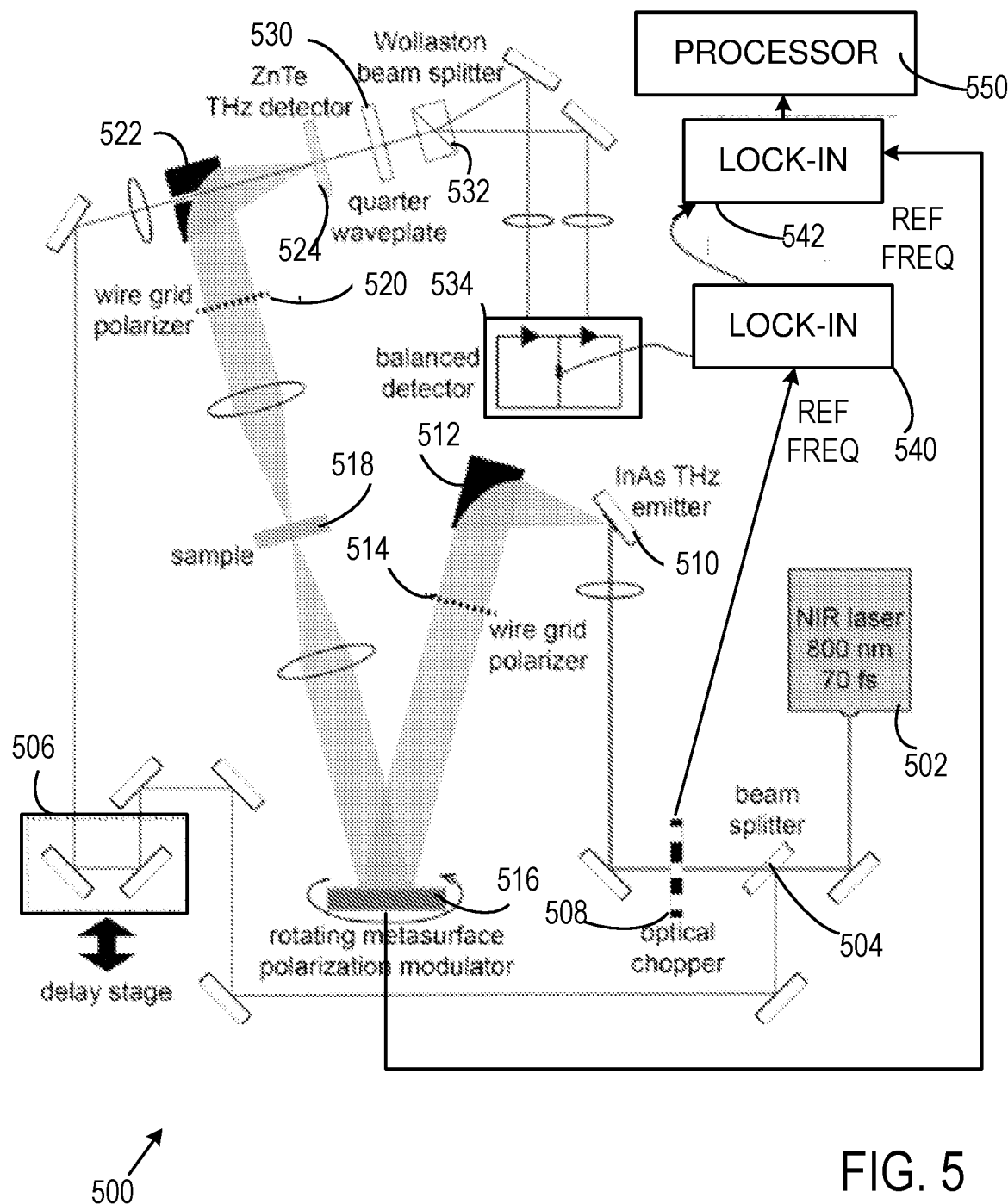
FIG. 5 illustrates a system for measurement of circular dichroism (CD) at THz frequencies.

Referring to FIG. 5, a THz CD spectrometer 500 includes, for example, a near-infrared (NIR) laser 502 that produces a beam that having NIR pulses of about 70 fs duration at a wavelength of about 800 nm. The NIR beam is directed to a beam splitter 504 and first and second portions of the NIR beam are then directed to a delay stage 506 and an optical chopper 508, respectively. The chopped NIR beam at chopping frequency F1 is then directed to a THz emitter 510 such as an InAs emitter, to produce THz radiation. The THz radiation is captured by a section 512 of a reflector that in turn directs the THZ radiation to a polarizer 514 (such as a wire grid polarizer) and then to a rotatable metasurface polarization modulator 516. Polarization modulated THz radiation is then coupled to a sample 518 and portions of the THz radiation from the sample are directed to a wire grid polarizer 520 (or other polarizer) and to a section 522 of a second reflector (typically an off-axis parabolic section) that focuses the polarization modulated (and chopper modulated) THz radiation to a THz detector 524 such as a ZnTe detector.

The second portion of the NIR beam is directed to the delay stage 506 and then to the THz detector 524. The THz radiation and the second portion of the NIR beam are directed to propagate collinearly to through the ZnTe detector 524. The THz radiation induces a birefringence which is "read out" by the second portion of the NIR beam. A state of polarization of the NIR beam is rotated by the THz radiation in the THz detector 524. A quarter wave retardation plate 530 and a polarizing beam splitter 532 direct the detector modulated portion of the NIR beam to a balanced detector 534 that includes two photodiodes. THz pulse amplitude is detected based on NIR beam modulation (SOP rotation) after the ZnTe detector 524 at a variety of delay times with respect to the THz radiation as established with the delay stage 506.

An output of the balanced detector 534 is coupled to a first lock-in amplifier 540 that is also coupled to a signal based on a chopping rate provided by the optical chopper 508. The output of the first lock-in amplifier 540 is coupled to a second lock-in amplifier 542 that also is coupled to receive a signal associated with a modulation provided by the metasurface polarizer modulator, i.e., typically a signal associated with a rotation rate of the metasurface device. Thus, the first lock-in amplifier 540 provides synchronous detection of a time-varying THz signal based on $f_{chop}$ while the second lock-in amplifier 542 provides synchronous detection of a CD signal based on $f_{mod}$, wherein $f_{chop}$ and $f_{mod}$ are optical chopper frequency and polarization modulation frequency, respectively.

The output of the second lock-in amplifier corresponds to a product of the first portion of the NIR beam and the modulation polarization modulated THz beam obtained from the ZnTe detector 524. By scanning the delay stage 506, an output signal is produced associated with a time domain representation of the modulated THz radiation. This output signal is Fourier transformed by a processor 550 to obtain CD spectroscopic data. In other examples, monochromatic THz sources and detectors can be used, and a Fourier transform is unnecessary.

Example 5. Metasurface Polarization Convertor for LCP and RCP

Figure 6:
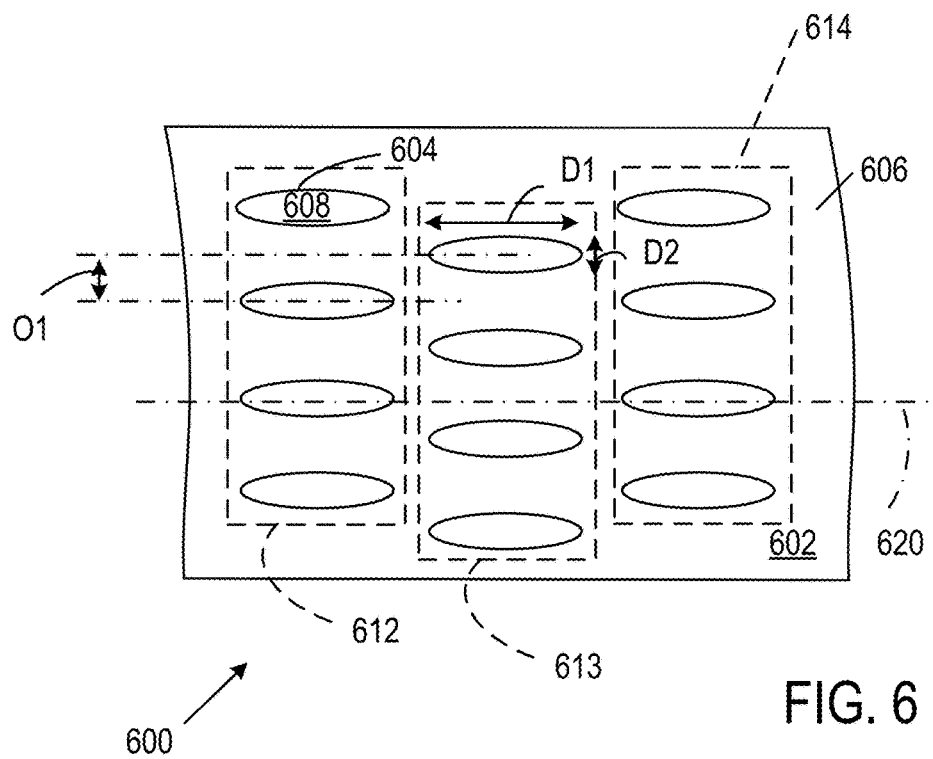
FIG. 6 illustrates a representative example of a linear-to-circular polarization convertor.

Referring to FIG. 6, a representative metasurface polarization convertor 600 includes a substrate 602 on which a plurality of pillars or other protrusions are defined, such as representative pillar 604. A major surface 606 of the substrate 602 is generally provided with a conductive layer such as gold or other conductor, and a top surface 608 (i.e., a surface facing away from the major surface 606) of the representative pillar 604 is provided with a conductive layer which, for convenience, can be the same as that provided to the major surface 606. Sidewalls of the pillars are generally non-conductive, or lack a conductive coating.

The pillars can be formed by etching a silicon substrate such as an intrinsic silicon substrate followed by directional deposition of a gold conductive layer on the major surface 606 and the top surface 608 (and similar surfaces of other pillars). In other examples, pillars are formed in an additional layer on a surface of a planar substrate.

In the example of FIG. 6, all pillars are of the same design, but in other examples, pillars of different sizes and shapes can be used. As shown the pillars are arranged in groups 612, 613, 614 within which the pillars are uniformly spaced, but the group 613 includes pillars that are positioned with an offset O1 vertically from the pillars of the sets 612, 614.

Each of the pillars is aligned with respect to an axis 620. While the pillars can have various shapes, each is elongated having a first dimension D1 along the axis 620 that is longer than a second dimension D2 perpendicular to the axis. Pillars can have oval, elliptical, rectangular, polygonal, be tapered quadrilaterals or other elongated shapes. In other examples, the pillars of one or more of the sets 612, 613, 614 can have differing shapes, sizes, and orientations from other sets.

Example 6. CD Measurement

Figure 7:
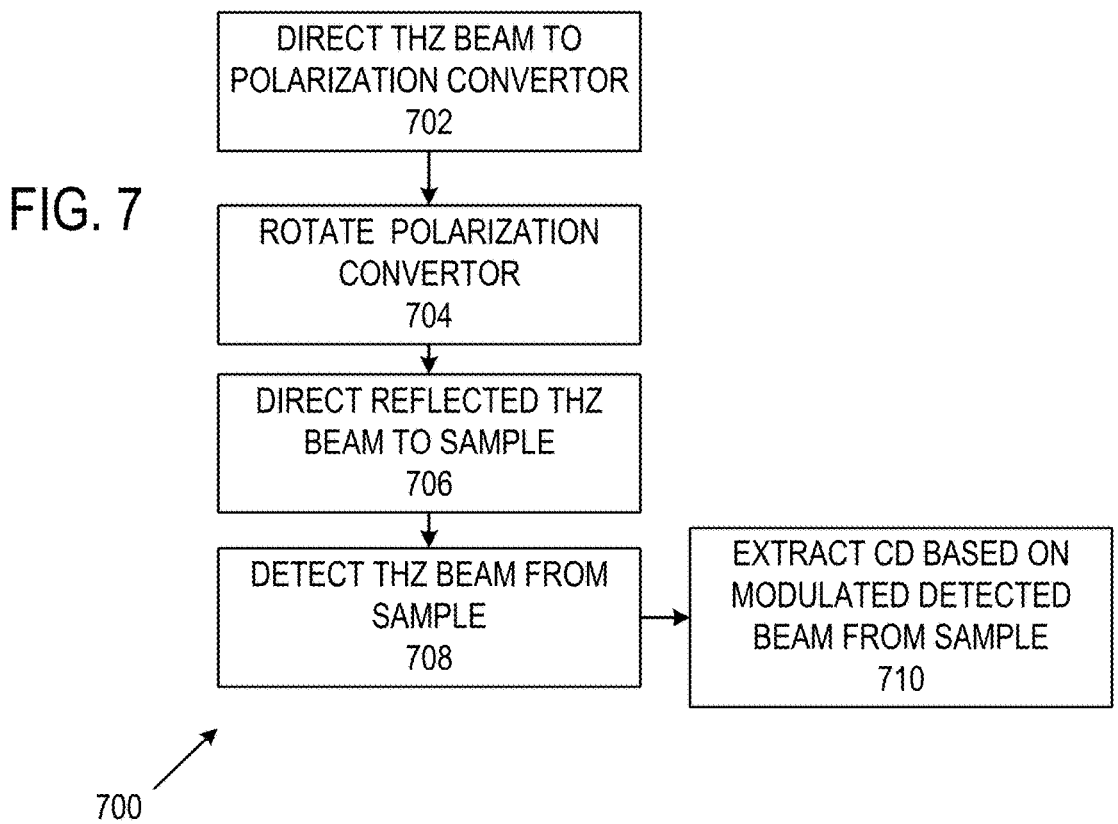
FIG. 7 illustrates a method of measuring CD.

Referring to FIG. 7, a representative method 700 includes directing a THz beam to a polarization convertor at 702 in order to provide RCP and LCP. The polarization convertor is rotated at 704, and a reflected beam is directed to a sample at 706. At 708, a THz beam from the sample is detected, and at 710, sample CD characteristics are extracted based on the detected THz signals. Typically, the detected THz beam produces signal portions at a variety of frequencies associated with a polarization convertor rotation rate, and only selected frequency components are used to establish CD characteristics of the sample.

Example 7. CD Measurement Control and Processing

Figure 8:
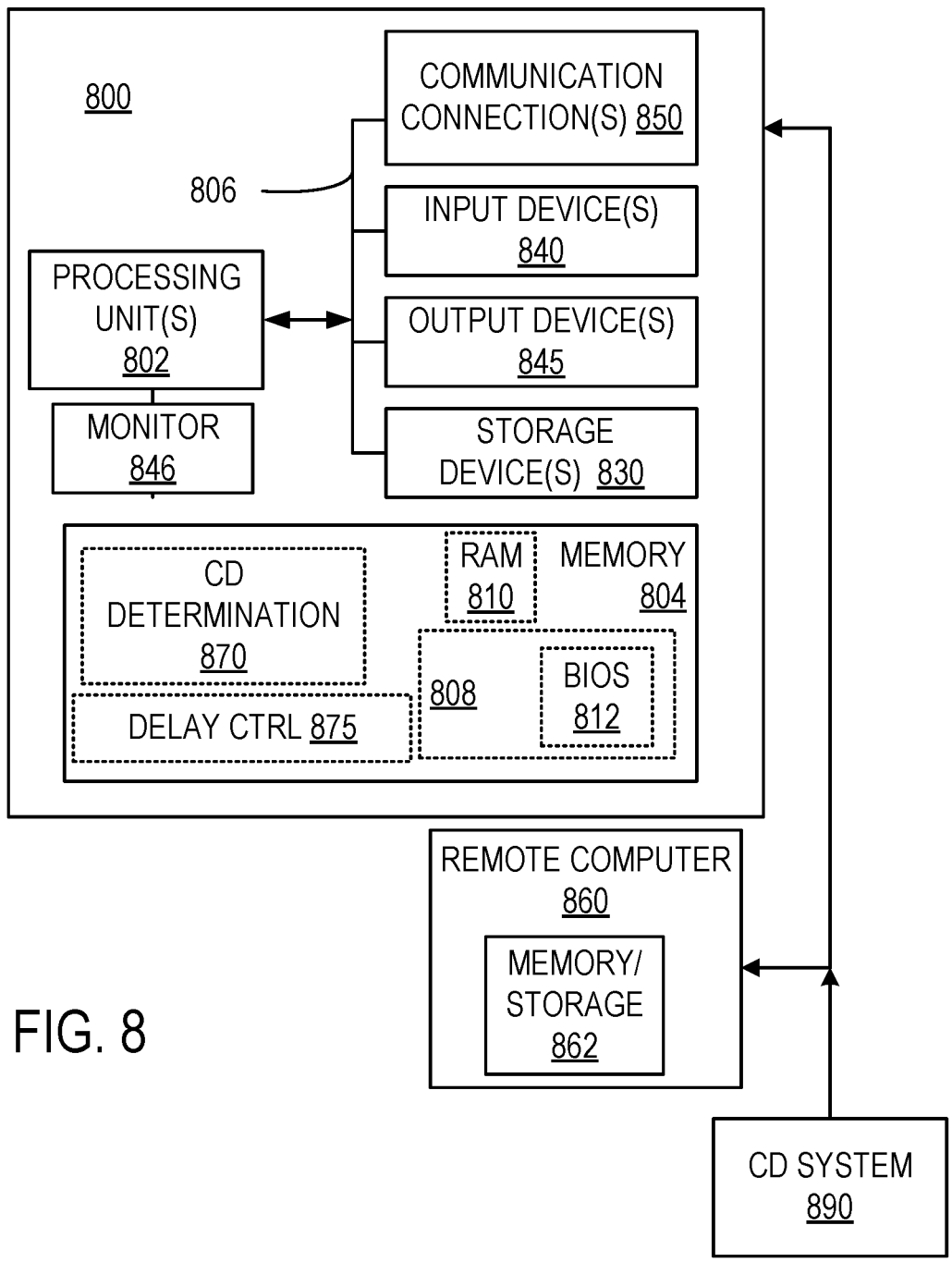
FIG. 8 illustrates a representative processing system for CD system control and data processing.

FIG. 8 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, an exemplary system for implementing the disclosed technology includes a general purpose computing device in the form of an exemplary conventional PC 800, including one or more processing units 802, a system memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The exemplary system memory 804 includes read only memory (ROM) 808 and random access memory (RAM) 810. A basic input/output system (BIOS) 812, containing the basic routines that help with the transfer of information between elements within the PC 800, is stored in ROM 808.

The exemplary PC 800 further includes one or more storage devices 830 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 806 by a hard disk drive interface, a magnetic disk drive interface, and an optical drive interface, respectively. The drives and their associated computer readable media provide nonvolatile storage of computer-readable instructions, data structures, program modules, and other data for the PC 800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 830 including an operating system, one or more application programs, other program modules, and program data. A user may enter commands and information into the PC 800 through one or more input devices 840 such as a keyboard and a pointing device such as a mouse. Other input devices may include a digital camera, microphone, joystick, game pad, satellite dish, scanner, or the like. These and other input devices are often connected to the one or more processing units 802 through a serial port interface that is coupled to the system bus 806, but may be connected by other interfaces such as a parallel port, game port, or universal serial bus (USB). A monitor 846 or other type of display device is also connected to the system bus 806 via an interface, such as a video adapter. Other peripheral output devices, such as speakers and printers (not shown), may be included.

The PC 800 may operate in a networked environment using logical connections to one or more remote computers, such as a remote computer 860. In some examples, one or more network or communication connections 850 are included. The remote computer 860 may be another PC, a server, a router, a network PC, or a peer device or other common network node, and typically includes many or all of the elements described above relative to the PC 800, although only a memory storage device 862 has been illustrated in FIG. 8. The personal computer 800 and/or the remote computer 860 can be connected to a logical a local area network (LAN) and a wide area network (WAN). Such networking environments are commonplace in offices, enterprise wide computer networks, intranets, and the Internet.

When used in a LAN networking environment, the PC 800 is connected to the LAN through a network interface. When used in a WAN networking environment, the PC 800 typically includes a modem or other means for establishing communications over the WAN, such as the Internet. In a networked environment, program modules depicted relative to the personal computer 800, or portions thereof, may be stored in the remote memory storage device or other locations on the LAN or WAN. The network connections shown are exemplary, and other means of establishing a communications link between the computers may be used.

In typical examples, memory portions 870 stores processor-executable instructions fir CD determinations such as CD spectroscopy, and can include processor-executable instructions for obtaining Fourier transforms. A memory portion 875 can include processor-executable instructions for varying an optical delay and control of polarization convertor rotation. Although CD is generally of interest, in some cases characteristics associated with liner birefringence such as real and/or imaginary parts of refractive indices along two or more axes can be obtained in addition to CD characteristics.

Example 8. Additional Polarization Converters

FIGS. 9A-9D illustrate performance available from metasurface polarization convertors such as illustrated in the inset images of FIG. 9A. FIGS. 10A-10B illustrate performance as a function of pillar extension along a major axis.

Example 9. Additional Considerations

As discussed, other elongated, anisotropic structures can be used that are periodic in two dimensions. A preferred implementation can be selected using computer simulations based on size, shape, pillar height, period, etc. Structures of interest are generally periodic in two dimensions. In fact, this also ease the design and fabrication. The post (or pillar) height is one of the important parameters and should be optimized in design. Other dielectric substrates can be used, preferably substrates that are simple fabrication processes for the periodic pillars (posts) by photolithography and deep reactive ion etching (DRIE) or other processes. For example, posts (pillars) can be made by patterning with photoresist, then metallizing the top of the pillars at the uncovered substrate surface, but not the side wall of the SU-8 pillars. Pillar dimensions can be scaled with the operational wavelength, but different dimensional parameters and should generally determine (and optimized) by full-wave numerical simulations. The dielectric substrate (along with the dielectric pillars) serves mainly as a mechanical support. The top metallic resonators (metallic coatings on pillar tops) and the bottom metallic "slots" (due to the presence of pillars), as well as the height of the pillars together provide the required dispersion of the reflection phase for parallel and perpendicular polarization components to obtain a constant phase difference of $\pi/2$.

Example 10

FIG. 11A illustrates a unit cell schematic of a metasurface structure according to embodiments of the present disclosure. The metasurface structure may be etched from a substrate (e.g., a high-resistivity silicon substrate). The unit cell includes a rectangular dielectric pillar on a substrate. Multiple such dielectric pillars may be formed on a single substrate. The pillars may be arranged with long directions along a structure major axis. A metal (e.g., gold) film, or other conductive material, may be situated on a top surface of each pillar and a surface of the substrate parallel to the top surfaces of the pillar, but not on one or more sidewalls of the substrate and pillars. This results in bilayer metallic structures. The metallic structures on the two layers are complementary to each other, with a cut-wire and slot resonators at the top and bottom layers, respectively. The resulting structure may be periodic with a square lattice, as shown by a scanning electron microscopy (SEM) image illustrated in FIG. 11B.

Fabrication of the unit cell may start by creating silicon pillars (e.g., of rectangular shape, L shape, elliptical shape, ovoid shape, or other anisotropic structure), with length (L) varying from about 100 μm to about 120 μm, width (w) equal to about 16 μm, height (h) equal to about 44 μm, and period (P) equal to about 100 μm. These dimensions are merely illustrated and that silicon pillars may have other dimensions without departing from the present disclosure. For example, one or more pillars of the substrate may extend from a substrate surface at least about 1 μm, 2 μm, 3 μm, 4 μm, 5 μm, 6 μm, 7 μm, 8 μm, 9 μm, 10 μm, 15 μm, 20 μm, or more.

Pillars may be spaced apart in various configurations. For example, gaps between pillars along a major axis may be at least 1 μm, 2 μm, 5 μm, 10 μm, or more. For further example, gaps between pillars along an axis perpendicular to the major axis may be at least 2 μm, 5 μm, 10 μm, 15 μm, 20 μm, 25 μm, 30 μm, 35 μm, 40 μm, 45 μm, 50 μm, or more.

The silicon pillars may be created directly from an intrinsic silicon wafer by photolithography and deep reactive ion etching (DRIE). Directional electron beam deposition may then, in at least some examples, be used to coat films on surfaces of the silicon, except for vertical side walls of the pillars. In at least some examples, the coated film may include conductive material, including gold (Au), silver (Ag), aluminum (Al), copper (Cu), titanium (Ti), or a combination thereof. In an example conductive films, on the pillars may have one thickness while conductive film, on the non-pillar portion of the substrate, may have a different thickness. Thickness of the conductive films may range from about 10 nm to about 200 nm. In an example, the conductive films on the pillars may be about 100 nm thick and the conductive film on the non-pillar portion of the substrate may be about 200 nm thick. The metasurface may be characterized using a THz time-domain spectrometer (THz-TDS) operating in reflection under normal incidence, with a gold mirror on a similar substrate used as a reference. Metasurface reflection amplitude and phase spectra may be retrieved from such characterization. Reflection for incident THz radiation linearly polarized parallel ($r_\parallel$) and perpendicular ($r_\perp$) to the major principal axis of the metasurface structures (when measuring $r_\perp$ the sample was rotated by 90° while keeping the incident polarization unchanged).

FIGS. 11D-11E show reflection amplitude and phase spectra for a metasurface sample with L=110 μm. It is worth pointing out the two main observations for the reflection of linear polarization components: i) high amplitude reflectivity (>0.9) over a broad frequency range, except for a reflection dip at about 0.5 THz for $r_\perp$ and several other much shallower dips for both $r^\perp$ and $r_\parallel$, as shown in FIG. 11D; and ii) nearly linear and parallel phase dispersion of $r_\perp$ and $r_\parallel$ over a broad frequency range approximately between 0.8 and 1.4 THz, as shown in FIG. 11E, which gives a nearly constant phase difference of $\Delta\phi \cong \pi/2$. From these measurements, spectra of the reflected circular polarization components were extracted, as plotted in FIG. 11F when the incident THz waves are linearly polarized at 45 degrees with respect to the metasurface principal axis. The foregoing illustrative metasurface thus enables broadband conversion of incident linear polarization to right-handed circular polarization with efficiencies $R_R$>90% (and $R_L \cong 0\%$), and the degree of circular polarization (DoCP) approaches unity. More specifically, DoCP was >90% between 0.7 THz and 1.4 THz (note that at most frequencies DoCP is about 100%), or a fractional bandwidth of FBW=67%. Further experiments on metasurface samples with L=100 μm and 120 μm revealed similar results except with a slight frequency shift (see inset to FIG. 11F), demonstrating the robustness of the broadband linear-to-circular polarization conversion disclosed herein. Simply rotating the metasurface or the incident linear polarization by 90 degrees will result in the broadband conversion to left-handed circular polarization.

Full-wave numerical simulations using CST Microwave Studio (or other commercially available FDTD and FEM software packages, or open source codes) were performed to help understand the observed broadband linear-to-circular polarization conversion. Gold was simulated by the Drude model with plasma frequency $\omega_p=2\pi \times 2181$ THz and collision frequency $\omega_e=2\pi \times 6.5$ THz. The intrinsic silicon is considered as a lossless dielectric with a dielectric constant of $\varepsilon_{Si}=11.7$. Results of the simulation are shown in FIGS. 11G-11I. All main features observed in experiments were reproduced with significant agreement. For $E_\perp$ it is expected that the top cut-wire array has negligible response. The reflection dip of $r_\perp$ at 0.48 THz in FIG. 11G (see FIG. 11D for experimental data) is caused by localized resonance of metal slots on the substrate surface, which also results in small phase dispersion as shown by $\phi_\perp$ in FIG. 11H. The peaks at 0.874 THz and 1.243 THz, and the corresponding dips next to them, are due to excitation of surface plasmon polariton resonances corresponding to the (0,1) and (1,1) modes of the periodic slot array, which, however, reveal negligible reflection phase dispersion, resulting in the close-to-linear dependence of phase on frequency. For $E_\parallel$, both the top cut-wire array (resonance) and the bottom metal layer (high reflection) interacted strongly with the incident field, resulting in two prominent resonance modes in $r_\parallel$ at 0.58 THz (small dip) and 1.41 THz (shoulder of the reflection dip) shown in FIG. 11G. These two resonance modes are more pronounced in FIG. 11H, where strong resonant phase dispersion of $\phi_\parallel$ was observed at the corresponding frequencies. Of particular relevance to the purpose of polarization conversion, between the two well-separated resonances, chi exhibits a close-to-linear off-resonance dispersion, where the slope can be tuned to be parallel to that of $\phi_\perp$. Phase values can be tuned as well to have a wrapped phase difference $\Delta\phi=|\phi_\perp - \phi_\parallel| \cong \pi/2$, responsible for the broadband linear-to-circular polarization conversion given in FIG. 1I (see FIG. 11F for experimental data).

Example 11

Semi-analytical calculations were carried out to shed light on the origin of the resonances. Few-layer metasurfaces have been successfully modeled as Fabry-Perot-like cavities, where each individual metallic metasurface layer was treated as an ultrathin interface. The multireflection among these interfaces results in interference and tunes the overall reflection/transmission or polarization rotation. Complex reflection and transmission coefficients (i.e., S-parameters) are obtained through full-wave numerical simulations for the two individual interfaces formed by the top cut-wire resonator array and the bottom metal slot array, as well as the propagation phase between them within the effective dielectric spacer formed by the silicon pillars, as schematically illustrated in the inset to FIG. 12A. Note that here perfect electrical conductor was used for metal to simplify simulations, but gives negligible difference when compared to the results from the Drude model in the THz frequency range. FIGS. 12A-12F plot amplitude and phase spectra of the reflection coefficients and propagation phase. The overall reflection for both $E_\perp$ and $E_\parallel$ components can be calculated separately using:

$$\tilde{r} = \tilde{r}_{11} + \frac{\tilde{t}_{21}\tilde{r}_{33}\tilde{t}_{12}e^{i2\beta}}{1 - \tilde{r}_{22}\tilde{r}_{33}e^{i2\beta}}, \qquad (1)$$

where $\tilde{r}$ and $\tilde{t}$ represent the complex reflection and transmission coefficients, respectively. The subscripts mn indicate incidence from medium n and reflection/transmission to medium m as marked by (1 . . . 4) in the inset to FIG. 12A. β is the propagation phase within the effective spacer. The calculated reflection amplitude and phase spectra are shown in FIGS. 12E and 12F. These demonstrate the validity of the model by reproducing all the main properties for both polarization components observed in experiments and full-wave simulations, as shown in FIG. 11.

For $E_\perp$, $r_{\perp,22}$ (and $r_{\perp,11}$) in FIG. 12A is rather small and nearly independent of frequency, and the metasurface reflection properties are mostly determined by the bottom metal slot array, given by the reflection amplitude $r_{\perp,33}$ and phase $\phi_{\perp,33}$ in addition to the propagation phase $2\beta_\perp$. In contrast, for $E_\parallel$, $r_{\parallel,22}$ and $r_{\parallel,33}$, shown in FIG. 12C, can both be large and therefore may need to be taken into account when calculating overall reflection. The multireflection and interference results in two Fabry-Perot-like resonances near 0.5 THz and 1.45 THz, as evidenced by the values of round-trip propagation phase, $\phi_{\perp,22}+\phi_{\perp,33}+2\beta_\perp=0$ and $2\pi$ indicated by the arrows in FIG. 12D, where underdamped resonances give a phase jump across resonance frequencies, as shown in FIG. 12F. Note that, compared to the experimental and full-wave simulation results in FIGS. 11D-11I, the discrepancy of semi-analytical calculations becomes more significant only at high frequencies. This is likely due to the coupling to high-order modes, which was not taken into account in the semi-analytical calculations described herein.

The above model calculations indicate that the bottom array of metal slots provides a high reflection coefficient $r_{33}$ (see FIGS. 12A and 12C) and a flat phase response $\phi_{33} \sim -\pi$ (see FIGS. 12B and 12D). The surface plasmon polariton resonances have a deteriorating effect on maintaining the high reflection amplitude for the perpendicular field component $E_\perp$. This suggests that a continuous metal reflector can be more desirable than a metal slot array, as schematically shown in FIG. 13A. For $E_\perp$, the metal cut-wires barely interact with the incident waves, and the metasurface structure is simply a metallic reflector with approximately linear phase dispersion within the frequency range of interest:

$$\tilde{r}_\perp = e^{i\phi_\perp(\nu)} = e^{i(b_\perp \nu + \phi_0)}, \qquad (2)$$

where $\phi_0$ is a fitting constant and determined by the nature of the surface, e.g., $\phi_0 \sim -\pi$ for the metallic reflector, and $b_\perp$ depends on the choice of the reference plane, which is the interface between media 1 and 2 as illustrated in the inset to FIG. 12A. In contrast, for $E_\parallel$, the two Fabry-Perot-like modes cause strong resonant phase dispersion, which can be generally described using two-mode coupled mode theory when the coupling between two modes is negligible:

$$\tilde{r}_\parallel(\nu) = r_\parallel e^{i\theta_\parallel} = \left[\tilde{r}_{bg} + \frac{\tilde{d}_1^2}{-i(\nu - \nu_1) + \gamma_1} + \frac{\tilde{d}_2^2}{-i(\nu - \nu_2) + \gamma_2}\right]e^{ib_\parallel \nu}. \qquad (3)$$

Here $r_{bg}$ is the reflection coefficient of the non-resonant channel similar to the role of $\phi_0$ in Equation (2), $b_\parallel$ is defined similarly to $b_\perp$ and $\tilde{d}_j$, $\nu_j$, and $\gamma_j$ (j=1,2) are the coupling coefficient, resonance frequency, and decay rate, respectively, of the corresponding modes. By controlling the metasurface anisotropy so that $\tilde{r}_{bg} \neq e^{i\phi_0}$ and $b_\parallel \neq b_\perp$, and tuning the resonance modes (e.g., the resonance characteristics and frequency separation), it is possible to tailor the reflection phase dispersion and phase difference of the two orthogonal field components. In general, selecting different parameters can provide positive or negative slope of $\Delta\phi$ and its value is arbitrary. An example phase dispersion of such a system is plotted in FIG. 13B for a set of parameters in Equations (2) and (3) (based on the unit of THz for frequency): $\phi_0 = -1.0815\pi$, $\tilde{r}_{bg}=e^{i0.76\pi}$, $b_\perp=1.4812$, $b_\parallel=0.9893$, $d_1=0.5068-i0.1825$, $d_2=0.3197-i0.1678$, $\nu_1=0.8228$, $\nu_2=2.5277$, $\gamma_1=0.1502$, and $\gamma_2=0.0887$. These parameters were selected to be in accordance with the full-wave simulation data described below. It was found that $\phi_\perp$ and $\phi_\parallel$ are parallel (i.e., they have the same slope) and $\Delta\phi=\pi/2$ remains constant over a significant range of off-resonance frequencies, thereby allowing broadband linear-to-circular polarization conversion exhibiting overall similarity with those shown in FIG. 11.

Example 12. Continuous Conductive Reflector

Following the above model analysis, systematic full-wave numerical simulations were performed using the metasurface structure with the unit cell shown in FIG. 13A, which includes a back continuous gold reflector, a rectangular dielectric pillar, and a gold cut-wire resonator. Such a metasurface structure can be fabricated using standard micro/nano-fabrication techniques. For example, the dielectric pillars can be created using SU-8 photoresist and polyimide by photolithography, where their relatively high material losses can be overcome by the off-resonance polarization conversion. Using polyimide to form the rectangular pillars and taking a dielectric constant of 3.0 and loss tangent of 0.05, FIG. 13C shows that the slope of $\Delta\phi$ can be tuned, as predicted by the two-mode coupled mode theory, to be positive, negative, or flat by tailoring the geometric dimensions of the metasurface structures (here we varied w and h while P and L remained unchanged). When w=14 μm and h=29 μm (P=110 μm and L=110 μm), although near the resonance frequencies there is significant absorption for the parallel polarization, at off-resonance frequencies between the two modes the reflection coefficients remain high (>95%) for both polarization components (see FIG. 13D) despite the relatively high material losses, and $\Delta\phi$ shows a nearly constant value of $\pi/2$ (see FIG. 13E) over a broad frequency range. The corresponding circular polarization components are extracted and shown in FIG. 13F, revealing highly efficient, achromatic, and clean linear-to-circular polarization conversion, with the right-handed circular polarization R (degree of circular polarization DoCP) higher than 90% between 1.05 THz and 2.26 THz (1.04 THz and 2.33 THz).

The broad bandwidth of the demonstrated metasurface linear-to-circular polarization conversion allows for coverage of the entire THz frequency range using just a few metasurface devices with scaled geometric dimensions. This permits the realization of far-infrared circular dichroism spectroscopy, which is of significant importance in biochemistry. Also there are increasing interests in the excitation of topologically protected and spin-polarized shift currents, and the corresponding potential applications, in emergent quantum materials such as topological insulators and Weyl and Dirac semimetals, where circularly polarized low-energy THz photons are beneficial to further investigate their rich physics. The teachings herein can be scaled to operate in other frequency ranges including microwave and mid-infrared, where metallic and dielectric losses can be sufficiently low. Even in the near-infrared and visible regimes, significant performance can be expected as the off-resonance polarization conversion may overcome the ohmic loss in metals.

Example 13. 45° Angle of Incidence Perpendicular Configuration

Metasurfaces of the present disclosure may be operated under different incidence angles. FIG. 14 illustrates a metasurface operating under a 45° incidence angle, centered at about 1.5 THz. FIG. 14A is a schematic of a reflective metasurface unit cell, along with incident and reflective beams at 45 degrees with respect to the surface normal, where the plane of incidence is perpendicular to the major principal axis of the structure, and the incidence linear polarization is at 45 degrees with respect to the plane of incidence. The parameters were chosen to operate over a broad bandwidth centered near 1.5 THz. FIG. 14B illustrates amplitude reflectivity for the parallel and perpendicular field components. FIG. 14C illustrates phase and phase difference for the parallel and perpendicular field components. FIG. 14D illustrations circular polarization components of the reflection. FIG. 14E illustrates degree of circular polarization of reflection when incident linear polarization is at 45 degrees with respect to the plane of incidence.

Example 14. 45° Angle of Incidence Parallel Configuration

FIG. 15A illustrates a metasurface operating under a 45° incidence angle, centered at about 1.5 THz. FIG. 15A is a schematic of a reflective metasurface unit cell, along with incident and reflective beams at 45° with respect to the surface normal, where the plane of incidence is parallel to the major principal axis of the structure, and the incidence linear polarization is at 45° with respect to the plane of incidence. The parameters were chosen to operate over a broad bandwidth centered near 1.5 THz. FIG. 15B illustrates amplitude reflectivity for the parallel and perpendicular field components. FIG. 15C illustrates phase and phase difference for the parallel and perpendicular field components. FIG. 15D illustrates circular polarization components. FIG. 15E illustrates degree of circular polarization of reflection when incident linear polarization is at 45° with respect to the plane of incidence.

Example 15 45° Angle of Incidence at Different Frequencies

FIGS. 16A-16E illustrate a metasurface operating at a 45° incidence angle, centered at about 1 THz. FIG. 16A is a schematic of a reflective metasurface unit cell, along with incident and reflective beams at 45° with respect to the surface normal, where the plane of incidence is perpendicular to the major principal axis of the structure, and the incidence linear polarization is at 45° with respect to the plane of incidence. The parameters were chosen to operate over a broad bandwidth centered near 1 THz. FIG. 16B illustrates amplitude reflectivity for the parallel and perpendicular field components. FIG. 16C illustrates phase and phase difference for the parallel and perpendicular field components. FIG. 16D illustrates circular polarization components. FIG. 16E illustrates degree of circular polarization of reflection when incident linear polarization is at 45° with respect to the plane of incidence.

Example 16. 55° Angle of Incidence

FIGS. 17A-17E illustrate a metasurface operating at a 35° angle with respect to the surface. FIG. 17A is a schematic of a reflective metasurface unit cell, along with incident and reflective beams at 35 degrees with respect to the surface (or incidence angle of 55 degrees), where the plane of incidence is perpendicular to the major principal axis of the structure, and the incident linear polarization is at 45° with respect to the plane of incidence. FIG. 17B illustrates amplitude reflectivity for the parallel and perpendicular field components. FIG. 17C illustrates phase and phase difference for the parallel and perpendicular field components. FIG. 17D illustrates circular polarization components. FIG. 17E illustrates degree of circular polarization of reflection when the incident linear polarization is at 45 degrees with respect to the plane of incidence. The results of FIGS. 17A-17E show significant tolerance of the incidence angle of the metasurface for broadband linear-to-circular polarization conversion.

Example 17. 35° Angle of Incidence

FIGS. 18A-18E illustrate a metasurface operating at a 55° angle with respect to surface. FIG. 18A is a schematic of a reflective metasurface unit cell, along with incident and reflective beams at 55 degrees with respect to the surface (or angle of incidence 35 degrees), where the plane of incidence is perpendicular to the major principal axis of the structure, and the incident linear polarization is at 45 degrees with respect to the plane of incidence. FIG. 18B illustrates amplitude reflectivity for the parallel and perpendicular field components. FIG. 18C illustrates phase and phase difference for the parallel and perpendicular field components. FIG. 18D illustrates circular polarization components. FIG. 18E illustrates degree of circular polarization of reflection when incident linear polarization is at 45 degrees with respect to the plane of incidence. The results of FIGS. 18A-18E show significant tolerance of the incident angle of the metasurface for broadband linear-to-circular polarization conversion.

Example 18—THz Circular Dichroism Spectroscopy

The difficulty in the development of a practical terahertz circular dichroism spectrometer (THz-CDS) is the lack of linear-to-circular polarization converters and circular polarization modulators. This challenge is addressed by the herein disclosed reflective metasurfaces operating at 45 degrees incidence angle for broadband linear-to-circular polarization conversion. With reference to FIG. 19, a representative THz-CDS spectrometer 1900 based on time-domain spectroscopy (TDS) includes a pulsed radiation source 1902 such as a femtosecond laser. In at least some examples, the pulsed light source may be a near-infrared (NIR) laser. In at least some examples, the NIR laser may be configured to produce a beam having NIR pulses of about 70 fs duration at a wavelength of about 800 nm but pulses of other durations and wavelengths may be used.

An output beam from the pulsed radiation source 1902 is directed to a beam splitter 1904 and first and second beam portions are directed to a lens 1906 and an optical delay 1954, respectively. The lens 1906 directs the first beam portion to a THz radiation emitter 1908 such an InAs emitter. A parabolic or other mirror 1910 collects and collimates THz radiation produced by the THz radiation emitter 1908 and then to a wire grid polarizer 1913 (or other THz polarizer) to purify the linear polarization. A parabolic or other mirror 1916 focuses or otherwise shapes the THz beam for delivery to alternate wire-grid linear polarizers attached onto an optical chopper 1918, which modulate the linear polarization between +45° and −45°. The linear-polarization modulated THz beam is reflected by a parabolic or other mirror 1920 to a linear-to-circular SOP convertor 1922 and the THz beam is output in alternate circular SOP as indicated at 1923. A parabolic or other mirror 1924 directs the modulated circular SOP THz beam to a sample 1926 and a parabolic or other mirror 1928 directs the THz beam from the sample 1926 to a wire grid polarizer 1930, and then to a THz detector (e.g., ZnTe crystal) 1936.

The second portion of the output beam from the pulsed laser source 1902 is coupled to the optical delay 1954 and then to the beam splitter 1932 and combined with the THz beam from the sample 1926. The combined beams are directed to a parabolic or other mirror 1934, and then to a ZnTe detector 1936 and then to a quarter wave plate 1936 and a Wollaston prism 1940 or other polarization dependent beam splitter. Reflectors 1942, 1944 direct beam portions in differing SOPs to respective lenses 1943, 1945 and to a balanced detector 1948. A lock-in amplifier 1950 is coupled to receive a detected signal from the balance detector 1948. The lock-in amplifier 1950 receives a reference signal input from a reference frequency generator 1960 that is also coupled to a chopper drive 1962 to control modulation provided by the optical chopper 1918.

The configuration of FIG. 19 is one example. In some examples, other types of THz emitters and detectors, other radiation sources, other lenses to replace the parabolic mirrors for THz beam collimation or focusing, and different types of polarizing beam splitters can be used. The details of FIG. 19 are provided for convenient explanation.

Example 19—Representative Optical Chopper

The optical chopper 1918 may be integrated with a linear polarization modulator as illustrated in FIGS. 21A-21B. A disc 2100 includes a central support 2101 and plurality of wire grid polarizers such a representative polarizers 2102, 2104, 2106 that can be based on, for example, metal (e.g., gold) gratings on a thin, low-loss substrate (e.g., a kapton film) and then attached to the disc 2100 using an adhesive (e.g., glue). As shown in FIGS. 21A-21B, the polarizers 2102, 2104, 2106 have alternate orientations of +45° and −45°, so THz linearly polarized radiation may be modulated to have a linear SOP that alternates between +45° and −45° as the disc 2100 rotates. FIG. 21A illustrates the polarizer 2104 situated to receive an input beam at 2110 and polarize the input beam along a direction 2112 that is parallel to a Y-axis of a coordinate system 2150. FIG. 21B illustrates the disc 2100 rotated so that the polarizer 2102 is situated to receive the input beam at 2110 and polarize the input beam along a direction 2113 parallel to an X-axis of the coordinate system 2150. The radiation may be modulated at a frequency $\Omega/2$ as the disc 2100 rotates (modulation frequency $\Omega$). The disc 2100 includes support struts such as strut 2118 and apertures such as aperture 2120. The polarizers and support struts are preferably uniformly spaced.

As shown in FIG. 19, chopped, modulated linearly polarized THz radiation produced with modulation from the disc 2100 can produce alternating linear polarization between +45° and −45°, and a reflective metasurface such as the surface 1922 can convert these linear polarizations alternately to right- and left-handed circular polarizations. The polarizers of the disc 2100 can be situated as different orientations, and are not limited to relative orientations between +45° and −45°.

THz time-domain measurements are performed by varying (sweeping in some examples) the optical delay applied to the second beam portion from the laser 1902 so that the THz signal from the sample is effectively sampled. As shown, the THz and probe beams may be focused using a parabolic mirror onto an optical nonlinear material such as a ZnTe crystal to produce the output signal based on a nonlinear effect such as the Pockels effect.

Circular dichroism in a sample can produce measurable absorption differences between right- and left-handed circular SOPs. The output of the ZnTe detector typically includes at least a component that corresponds to a product of the amplitude of the delayed beam and the polarization modulated THz beam from the sample 1926. By scanning the optical delay stage, an output signal may be produced associated with a time domain representation of the modulated THz radiation. This output signal may be Fourier transformed by a processor to obtain CD spectroscopic data. In other examples, monochromatic THz sources and detectors can be used, resulting in a Fourier transform being unnecessary.

THz-CDS based on frequency-domain spectroscopy (FDS) can also be realized by changing a pulsed THz source to a frequency tunable continuous waves (CW) source, such as THz quantum cascade lasers and THz transmitters based on electronic approaches (e.g., those from Virginia Diodes, Inc.). In this case, the detection scheme may also need to change correspondingly. Various lenses and mirrors may be used to direct radiation in the THz-CDS. For example, polymethylpentene lenses may be used.

Example 20—THz Polarization Convertors with Continuous Base Conductor

Referring to FIGS. 22A-22B, a polarization convertor 2200 includes a substrate 2202 with a conductive layer 2204. Pillars such as representative pillars 206 are situated on the conductive coating 2204 and include a spacer portion 2208 and a conductive top portion 2210. Pillars such as these using continuous base conductive layers such as conductive layer 2204 tend to exhibit superior performance.

Example 21—THz Polarization Convertors with One Dimensional Pillars

Referring to FIG. 23, a polarization convertor 2300 includes a substrate 2302 with a conductive layer 2304.

Pillars such as representative pillars 2306 are situated on the conductive coating 2304 and include a spacer portion and a patterned conductive top portion with conductive portions 2310 and non-conductive portions 2311. Patterned conductive portions as illustrated are periodic in two dimensions but are situated on extended pillars.

Example 22—THz Polarization Convertors with Birefringent Layers

Referring to FIGS. 24A-24B, a polarization convertor 2400 includes a substrate 2402 with a conductive layer 2404. Patterned conductors such as conductive strips 2406 are situated on a birefringent spacer layer 2408. Patterned conductors can be period in one or two directions, as preferred. In this configuration, pillars are not required as material birefringence is used for SOP conversion, and not form birefringence.

Example 23—THz Polarization Convertors with Separate Spacer Layer

Referring to FIGS. 25A-25B, a polarization convertor 2500 includes a substrate 2502 with a conductive layer 2504. Pillars such as representative pillar 2505 are formed of a spacer layer portion 2506 that extends to a surface of the substrate 2502 and a conductive cap 2508. The spacer layer potion can be formed of kapton, photoresist, or other material. The conductive cap 2508 can be part of a pattern as disclosed above.

Example 24—Representative Fabrication Method

Referring to FIG. 26, a method 2600 includes defining pillars on a substrate at 2602. A conductive coating is applied to pillar top surfaces and a substrate surface at 2604. In some examples, pillars are defined by etching a substrate such as a silicon substrate or by patterning a spacer layer such as a photoresist or other layer. In some examples, the pillars are formed after the conductive layer is provided on the substrate so that the pillars are situated on a conductive layer, which typically enhances device performance.

Example 25—Representative Fabrication Method

Referring to FIG. 27, a method 2700 includes applying a conductive coating to a substrate surface at 2702. A THz radiation transmissive dielectric is applied to the substrate at 2704. At 2706, pillars are defined in the dielectric layer typically by exposing and developing a dielectric layer that comprises a photoresist. At 2706B, undeveloped photoresist is removes. At 2708, a conductive coating is applied to a pillar top surface.

FIG. 28 illustrates substrate processing according to the method 2700 of FIG. 27. A conductive layer 2804 is situated on a major surface of a substrate 2802 and a spacer layer 2806 is applied. In some examples, the spacer layer 2806 is deposited by spin coating and can be a photoresist or other material. The spacer layer 2806 is then patterned with pattern regions 2808, 2810 that define a pillar 2814. Patterning can be achieved by suitable exposure of a photoresist spacer layer. A pillar 2812 then is situated on the conductive layer 2804, and a conductive layer 2814 is formed on a top surface of the pillar.

The examples above are not to be taken as limiting, and what is claimed is all that comes within the appended claims.

I claim:

1. A terahertz polarization convertor, comprising:
a substrate having a substrate surface; and
a plurality of pillars extending away from the substrate surface and having cross-sections parallel to the substrate surface, the cross-sections associated with a first dimension that is greater than a second dimension, wherein the first dimensions are aligned with respect to a major axis, the plurality of pillars and the substrate surface operable to convert a single terahertz (THz) beam directed to the surface in a linear state of polarization (SOP) to a right-handed circular polarization (RCP) or a left-handed circular polarization (LCP) based on an alignment of the major axis with respect to the linear THz SOP.

2. The terahertz polarization convertor of claim 1, wherein the substrate surface is conductive.

3. The terahertz polarization convertor of claim 1, wherein a pillar surface facing away from the substrate surface is conductive.

4. The terahertz polarization convertor of claim 1, wherein the pillars extend from the substrate surface at least 10 µm, 15 µm, 20 µm, or 25 µm.

5. The terahertz polarization convertor of claim 1, wherein the substrate and pillars are formed in a common silicon substrate.

6. The terahertz polarization convertor of claim 1, further comprising a conductive coating on the substrate surface and pillar surfaces facing away from the substrate surface.

7. The terahertz polarization convertor of claim 6, wherein the pillars and the substrate are formed of different materials.

8. The terahertz polarization convertor of claim 7, wherein the conductive coating on the substrate surface includes portions situated between the pillars and the substrate surface.

9. The terahertz polarization convertor of claim 7, further comprising at least one conductive coating on the substrate surface and pillar surfaces facing away from the substrate surface.

10. The terahertz polarization convertor of claim 1, wherein the pillars are arranged in at least one array.

11. The terahertz polarization convertor of claim 1, wherein the pillars are arranged in interleaved offset arrays.

12. The terahertz polarization convertor of claim 1, wherein the pillars are arranged so that gaps between pillars along the major axis are at least 10 µm and gaps between pillars along an axis perpendicular to the major axis are at least 50 µm.

13. The terahertz polarization convertor of claim 1, wherein the pillars form a one dimensional array that is periodic in a direction perpendicular to the major axis, and further comprising a conductive coating situated on pillar surfaces facing away from the substrate surface, wherein the conductive coating is periodically patterned along the major axis, and conductive pattern elements of the periodic pattern have aspect ratios of at least 2:1.

14. A terahertz polarization convertor, comprising:
a substrate having a substrate surface;
a spacer layer situated on the substrate surface; and
a patterned conductive coating on at least one of the substrate surface and a spacer layer surface facing away from the substrate surface, wherein the patterned conductive coating includes a first array and a second array of elongated conductive areas aligned with respect to an axis and having an effective length to effective width aspect ratio of at least 2:1, wherein the first and second arrays are offset and interleaved with respect to each other and the patterned conductive coating and the spacer layer are operable to convert a linear terahertz (THz) state of polarization (SOP) to a right circular polarization (RCP) or a left circular polarization (LCP) based on an alignment of the axis with respect to the linear THz SOP.

15. The terahertz polarization convertor of claim 14, further comprising a conductive coating on the substrate surface and the patterned conductive coating is on the spacer layer surface facing away from the substrate surface, or a conductive coating on the spacer layer surface facing away from the substrate surface and the patterned conductive coating is on the substrate surface.

16. The terahertz polarization convertor of claim 14, wherein the patterned conductive coating includes a plurality of conductive regions having effective lengths of at least 50 μm, effective widths of at least 15 μm, and are spaced apart in direction perpendicular to the axis by at least 50 μm.

17. A method, comprising:
directing linearly polarized THz radiation to the polarization convertor of claim 1 to produce a circular SOP; and
directing the circular SOP to a sample.

18. The method of claim 17, wherein the circular SOP is formed by reflection from the polarization convertor.

19. The method of claim 17, wherein the linear SOP is at 45 degrees with respect to the major axis.

20. A THz polarization modulator, comprising:
the terahertz polarization convertor of claim 1; and
a rotational stage coupled to the polarization convertor and operable to rotate the polarization convertor about an axis that is perpendicular to the substrate surface.

21. The THz polarization modulator of claim 20, further comprising a linear polarizer situated to provide a linear SOP to the polarization convertor.

22. The polarization convertor of claim 1, wherein the plurality of pillars and the substrate surface are operable to convert THz beams that include frequencies between 0.05 THz and 20 THz.

23. The polarization convertor of claim 1, wherein the plurality of pillars and the substrate surface are operable to convert THz beams at angles of incidence that are less than 55 degrees.

* * * * *